US010725905B2

(12) United States Patent
Choi et al.

(10) Patent No.: US 10,725,905 B2
(45) Date of Patent: Jul. 28, 2020

(54) MEMORY SYSTEM AND OPERATING METHOD THEREOF

(71) Applicant: SK hynix Inc., Gyeonggi-do (KR)

(72) Inventors: Hae-Gi Choi, Gyeonggi-do (KR); Kyeong-Rho Kim, Gyeonggi-do (KR); Su-Chang Kim, Gyeonggi-do (KR); Jin-Woong Kim, Gyeonggi-do (KR); Hui-Won Lee, Seoul (KR); Eun-Soo Jang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 61 days.

(21) Appl. No.: 16/101,001

(22) Filed: Aug. 10, 2018

(65) Prior Publication Data

US 2019/0205246 A1    Jul. 4, 2019

(30) Foreign Application Priority Data

Jan. 4, 2018  (KR) ........................ 10-2018-0001265

(51) Int. Cl.
*G06F 12/02* (2006.01)
*G06F 12/126* (2016.01)
*G06F 3/06* (2006.01)

(52) U.S. Cl.
CPC .......... *G06F 12/0246* (2013.01); *G06F 3/064* (2013.01); *G06F 3/0614* (2013.01); *G06F 3/0652* (2013.01); *G06F 3/0679* (2013.01); *G06F 12/126* (2013.01); *G06F 2212/1032* (2013.01); *G06F 2212/222* (2013.01); *G06F 2212/7201* (2013.01); *G06F 2212/7205* (2013.01)

(58) Field of Classification Search
CPC ...... G06F 3/0608; G06F 3/0614; G06F 3/064; G06F 3/0652; G06F 3/0679; G06F 12/0246; G06F 12/0253; G06F 12/126; G06F 2212/1032; G06F 2212/1044; G06F 2212/222; G06F 2212/7201; G06F 2212/7205
USPC ................................ 711/103, 156, 158, 159
See application file for complete search history.

(56) References Cited

U.S. PATENT DOCUMENTS

| 2011/0066788 | A1* | 3/2011 | Eleftheriou | .......... G11C 16/349 711/103 |
| 2011/0145473 | A1* | 6/2011 | Maheshwari | ....... G06F 12/0866 711/103 |
| 2018/0024756 | A1* | 1/2018 | Miller | ................. G06F 12/0862 711/103 |

FOREIGN PATENT DOCUMENTS

KR    1020140078893    6/2014

* cited by examiner

*Primary Examiner* — Gary J Portka
(74) *Attorney, Agent, or Firm* — IP&T Group LLP

(57) ABSTRACT

A memory system includes a nonvolatile memory device including a plurality of memory blocks each including a plurality of pages; and a controller suitable for, when writing a plurality of data in the pages according to a write request from a host, writing the plurality of data with tags, classified into N number of kinds depending on a usage pattern of each data, together in the pages. The controller manages a list of victim blocks as a target of a merge operation, the controller manages entire valid pages included in the victim blocks, by classifying them into N number of page groups depending on a kind of each of the entire valid pages, and the controller selects valid pages to be moved to a free block in the merge operation, among the entire valid pages, and N may be a natural number of 2 or greater.

18 Claims, 15 Drawing Sheets

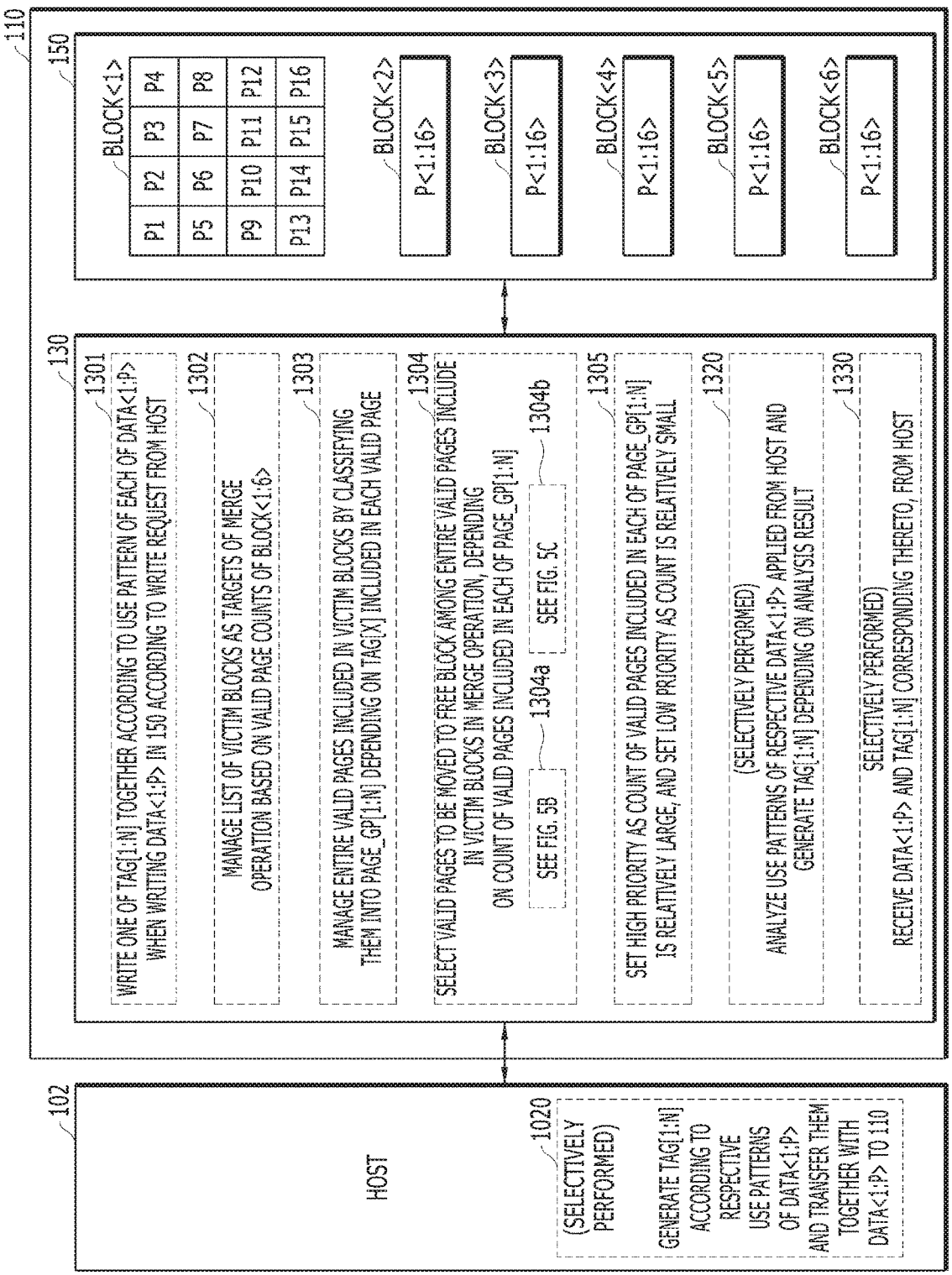

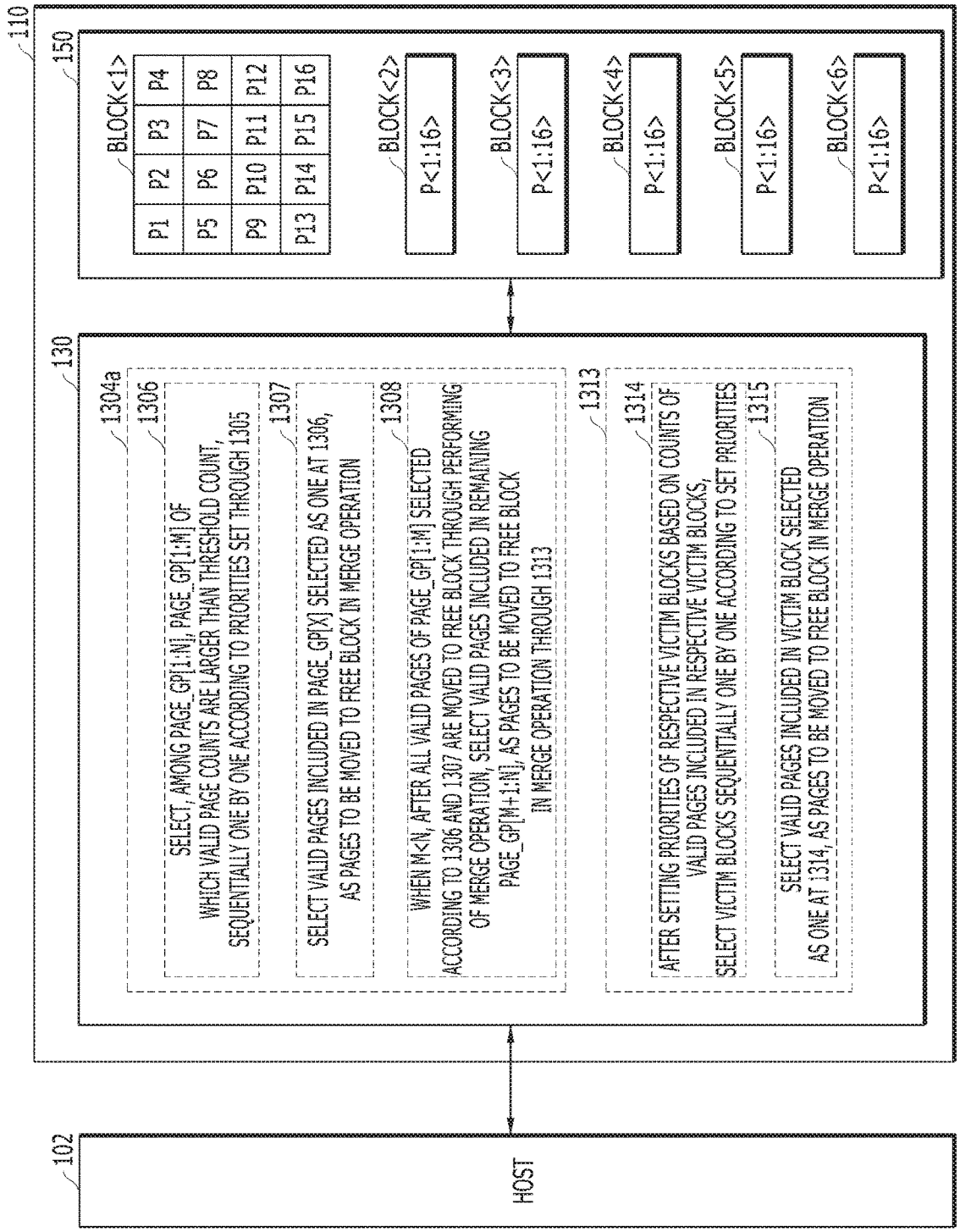

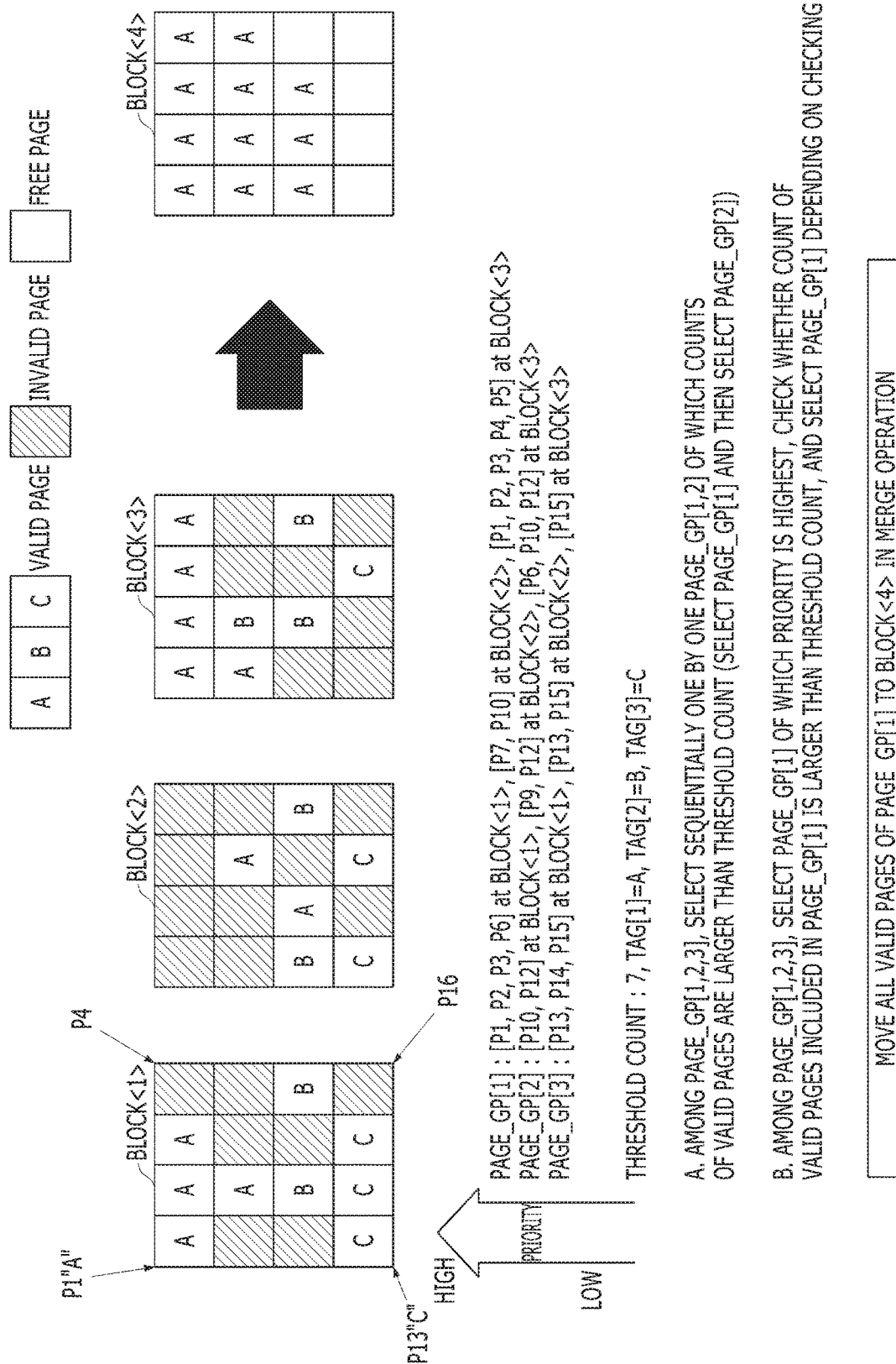

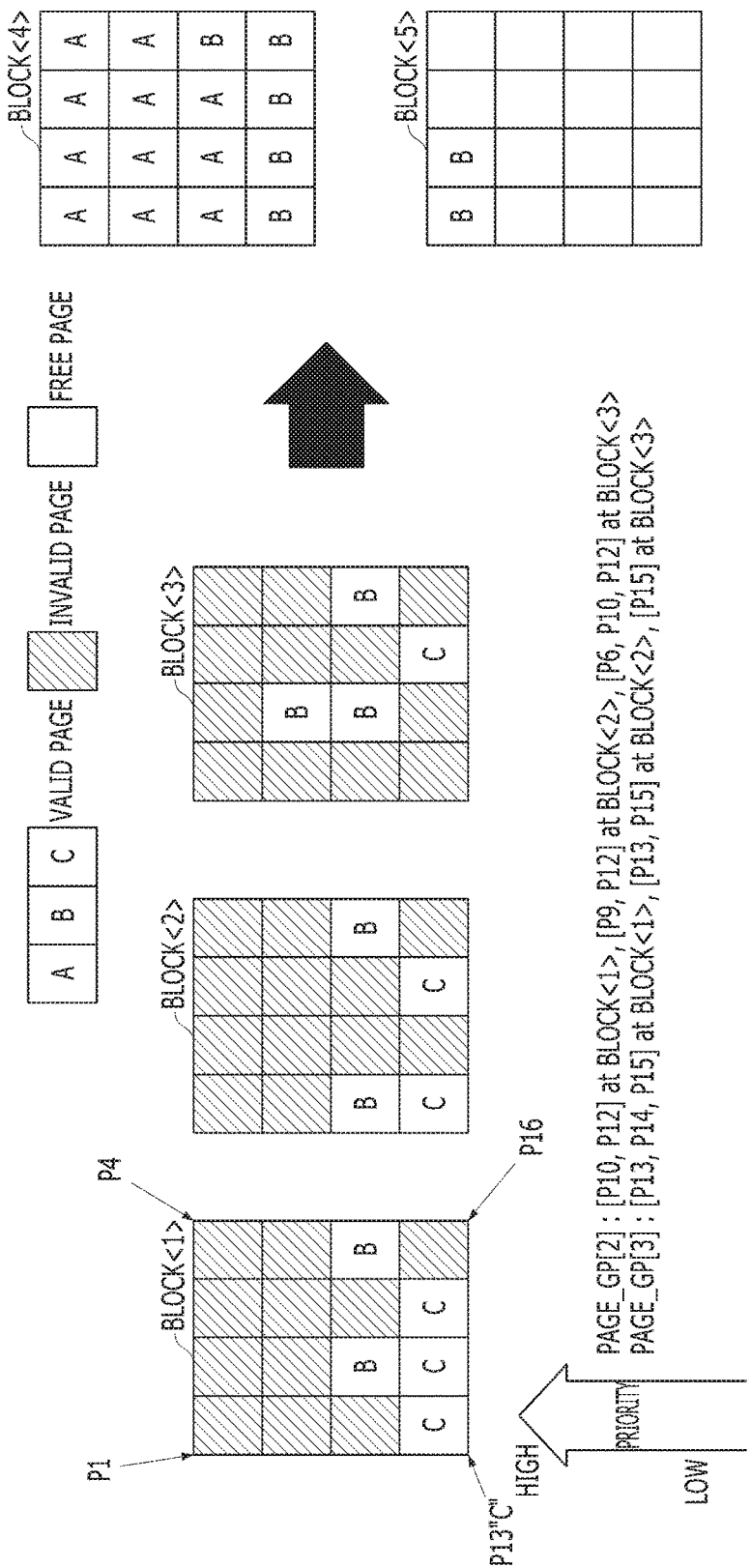

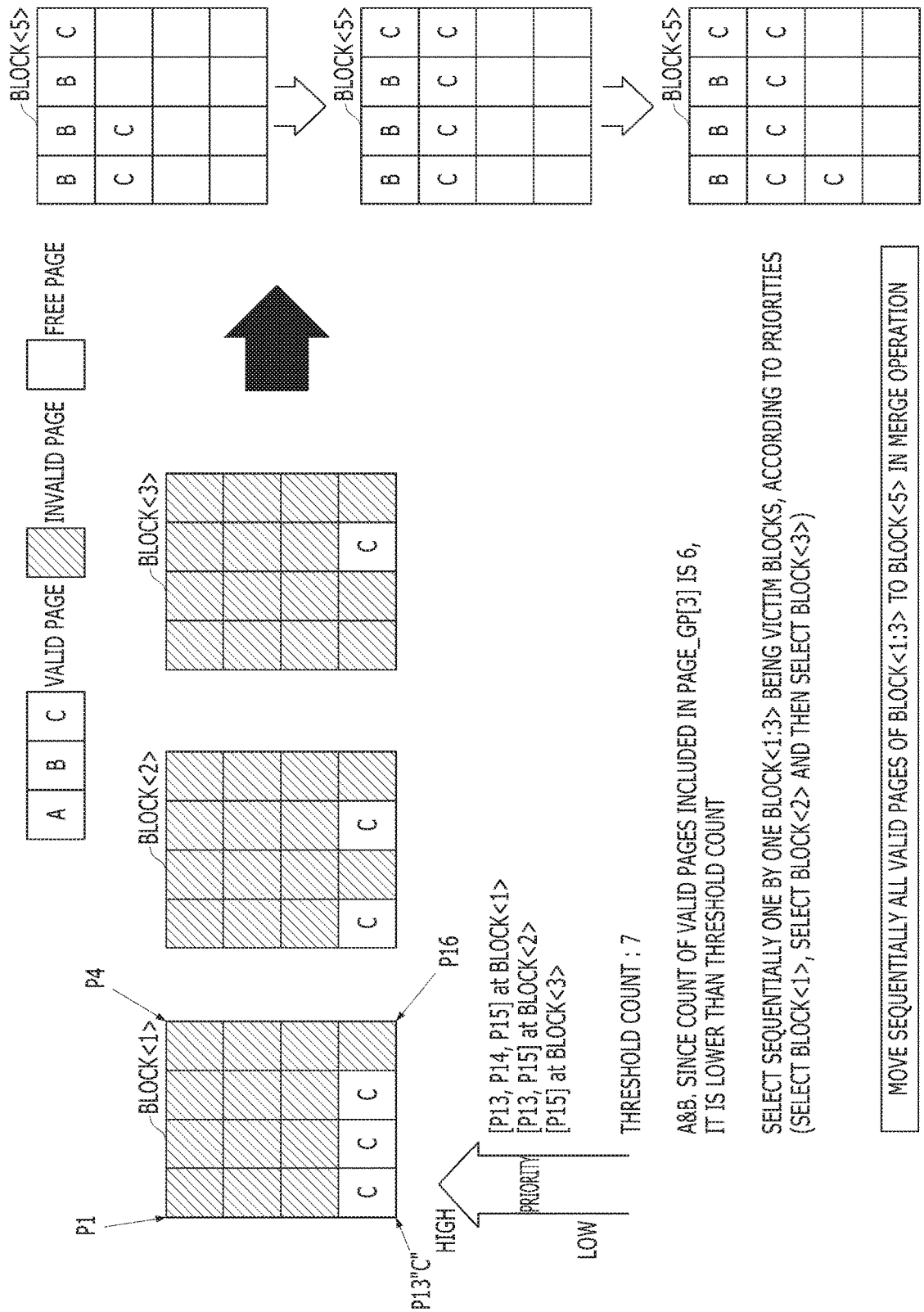

MEMORY SYSTEM AND OPERATING METHOD THEREOF

CROSS-REFERENCE TO RELATED APPLICATION

This application claims priority under 35 U.S.C. § 119 to Korean Patent Application No. 10-2018-0001265 filed on Jan. 4, 2018, which is incorporated herein by reference in its entirety.

BACKGROUND

1. Field

Exemplary embodiments relate generally to a memory system, and, more particularly, to a memory system which supports a merge operation and an operating method thereof.

2. Discussion of the Related Art

The computer environment paradigm has moved to ubiquitous computing systems that can support computing made to appear anytime and anywhere. The use of portable electronic devices such as mobile phones, digital cameras, and notebook computers has rapidly increased. These portable electronic devices generally use a memory system having one or more memory devices for storing data. A memory system may be used as a main or an auxiliary storage device of a portable electronic device.

Memory systems provide excellent stability, durability, high information access speed, and low power consumption because they have no moving parts (e.g., a mechanical arm with a read/write head) as compared with a hard disk device. Examples of memory systems having such advantages include universal serial bus (USB) memory devices, memory cards having various interfaces, and solid-state drives (SSD).

Due to continuous consumer demand for improved electronic devices new improved memory systems are needed.

SUMMARY

Various embodiments of the present invention disclosure are directed to a memory system capable of using a tag or an indicator, showing a data usage pattern, to efficiently select victim pages during a merge operation and an operating method thereof.

In an embodiment, a memory system may include: a nonvolatile memory device including a plurality of memory blocks each including a plurality of pages; and a controller suitable for, when writing a plurality of data in the pages according to a write request from a host, writing the plurality of data with tags, classified into N number of kinds depending on a usage pattern of each data, together in the pages, the controller may manage a list of victim blocks as a target of a merge operation, based on counts of valid pages included in the respective memory blocks, the controller may manage entire valid pages included in the victim blocks, by classifying them into N number of page groups depending on a kind of each of the entire valid pages, and the controller may select valid pages to be moved to a free block in the merge operation, among the entire valid pages, depending on a count of valid pages included in each of the N number of page groups, and N may be a natural number of 2 or greater.

The controller may set a high priority as a count of valid pages included in each of the N number of page groups is large, and may set a low priority as a count of valid pages included in each of the N number of page groups is small.

The controller may sequentially select M number of page groups in each of which a count of valid pages is equal to greater than a threshold count, among the N number of page groups, depending on a priority, may move valid pages of a selected page group to a free block in the merge operation, and M may be equal to or less than N.

In the case where M is less than N, before performing the merge operation, the controller may set priorities of the respective victim blocks corresponding to N-M number of page groups, based on counts of valid pages included in the respective victim blocks, may sequentially select the respective victim blocks corresponding to the N-M number of page groups according to the set priorities, may move valid pages of a selected page group in the merge operation, to a free block, and then may move valid pages of a selected block, to a free block.

In the case where a count of valid pages included in a specific page group having a highest priority among the N number of page groups is equal to or greater than the threshold count, the controller may move the valid pages included in the specific page group, to a free block in the merge operation, may update the list of the victim blocks, may update the N number of page groups based on an updated list of victim blocks, and may select again valid pages to be moved to a free block in a following merge operation.

In the case where the count of the valid pages included in the specific page group is less than the threshold count, the controller may set priorities of the respective victim blocks based on counts of valid pages included in the victim blocks, may sequentially select the respective victim blocks according to the set priorities, and may move valid pages of a selected block, to a free block in the merge operation.

The controller may generate N kinds of tags corresponding to the respective data according to a result of analyzing usage patterns of the data applied from the host, and may store the data and the N kinds of tags corresponding to the respective data together in the pages.

The controller may receive the data and N kinds of tags corresponding to the respective data from the host, and may store them together in the pages.

The data may be classified into hot data, warm data and cold data depending on a usage pattern.

The data may be classified into L number of kinds in correspondence to K number of workloads performed in the host, K may be a natural number and L may be a natural number equal to or greater than K.

In an embodiment, a method for operating a memory system including a nonvolatile memory device including a plurality of memory blocks each including a plurality of pages, the method may include: writing, when writing a plurality of data in the pages according to a write request from a host, the plurality of data with tags classified into N number of kinds depending on a usage pattern of each data, together in the pages; a first managing act of managing a list of victim blocks as a target of a merge operation, based on counts of valid pages included in the respective memory blocks; a second managing act of managing entire valid pages included in the victim blocks, by classifying them into N number of page groups depending on a kind of each of the entire valid pages; a selecting act of selecting valid pages to be moved to a free block in the merge operation, among the entire valid pages, depending on a count of valid pages included in each of the N number of page groups; and a merging act of moving the valid pages selected in the selecting act, to a free block in the merge operation, N may be a natural number of 2 or greater.

The method may further include: a first setting act of setting a high priority as a count of valid pages included in each of the N number of page groups managed in the second managing act is large, and sets a low priority as a count of valid pages included in each of the N number of page groups managed in the second managing act is small.

The selecting act may include: a first selecting act of sequentially selecting M number of page groups in each of which a count of valid pages is equal to greater than a threshold count, among the N number of page groups, depending on a priority set through the first setting act, and selecting valid pages of a selected page group as pages to be moved to a free block in the merge operation, and the merging act may move valid pages selected by the unit of page group through the first selecting act, to a free block, and M may be a natural number equal to or less than N.

In the case where M is less than N, the selecting act may further include: a second setting act of, before performing the merge operation after the first selecting act, setting priorities of the respective victim blocks corresponding to N-M number of page groups, based on counts of valid pages included in the respective victim blocks; and a second selecting act of sequentially selecting the victim blocks corresponding to the N-M number of page groups according to the priorities set in the second setting act, and selecting valid pages of a selected block, as pages to be moved to a free block in the merge operation, and the merging act may move valid pages selected by the unit of page group through the first selecting act, to a free block in the merge operation, and then, may move valid pages selected by the unit of block through the second selecting act, to a free block in the merge operation.

The selecting act may further include: a third selecting act of selecting, among the N number of page groups, a specific page group having a highest priority depending on a priority set through the first setting act, and selecting, in the case where a count of valid pages included in the specific page group is equal to or greater than the threshold count, the valid pages of the specific page group, as pages to be moved to a free block in the merge operation, and after moving, through the merging act, all valid pages selected in the third selecting act, the list of the victim blocks managed in the first managing act is updated, the N number of page groups managed in the second managing act is updated based on an updated list of victim blocks, and then the third selecting act is performed again.

The selecting act may further include: a third setting act of setting, in the case where the count of the valid pages included in the specific page group is less than the threshold count, priorities of the respective victim blocks based on counts of valid pages included in the victim blocks; and a fourth selecting act of sequentially selecting the victim blocks according to the priorities set in the third setting act, and selecting valid pages of a selected block, as pages to be moved to a free block in the merge operation.

The writing may include: generating N kinds of tags corresponding to the respective data according to a result of analyzing usage patterns of the data applied from the host; and storing the data and the N kinds of tags corresponding to the respective data together in the pages.

The writing may include: receiving the data and N kinds of tags corresponding to the respective data from the host; and storing the data and the N kinds of tags corresponding to the respective data together in the pages.

The data may be classified into hot data, warm data and cold data depending on a usage pattern.

The data may be classified into L number of kinds in correspondence to K number of workloads performed in the host, K is a natural number and L is a natural number equal to or greater than K.

In an embodiment, a memory system may include: a nonvolatile memory device including a plurality of memory blocks, each including a plurality of pages, each page storing a data with a tag corresponding to the data; and a controller suitable for receiving a plurality of data with a write request entered from a host, generating the tag for each data, and writing the data with the tag in each page, the tags may include N number of types determined based on a usage pattern of each data, N being a natural number of 2 or greater, and the controller may check the tags of data in at least one victim block to determine which data are moved to a free block first or later.

BRIEF DESCRIPTION OF THE DRAWINGS

These and other features and advantages of the present invention will become apparent to those skilled in the art to which the present invention pertains from the following detailed description in reference to the accompanying drawings, wherein:

FIGS. 5A to 5C are diagrams illustrating a representation of an example of a memory system in accordance with an embodiment of the present disclosure;

FIGS. 6A to 6C are representations of examples of diagrams to assist in the explanation of the operation of the memory system in accordance with the embodiment of the present disclosure shown in FIGS. 5A to 5C;

DETAILED DESCRIPTION

Figure 1:
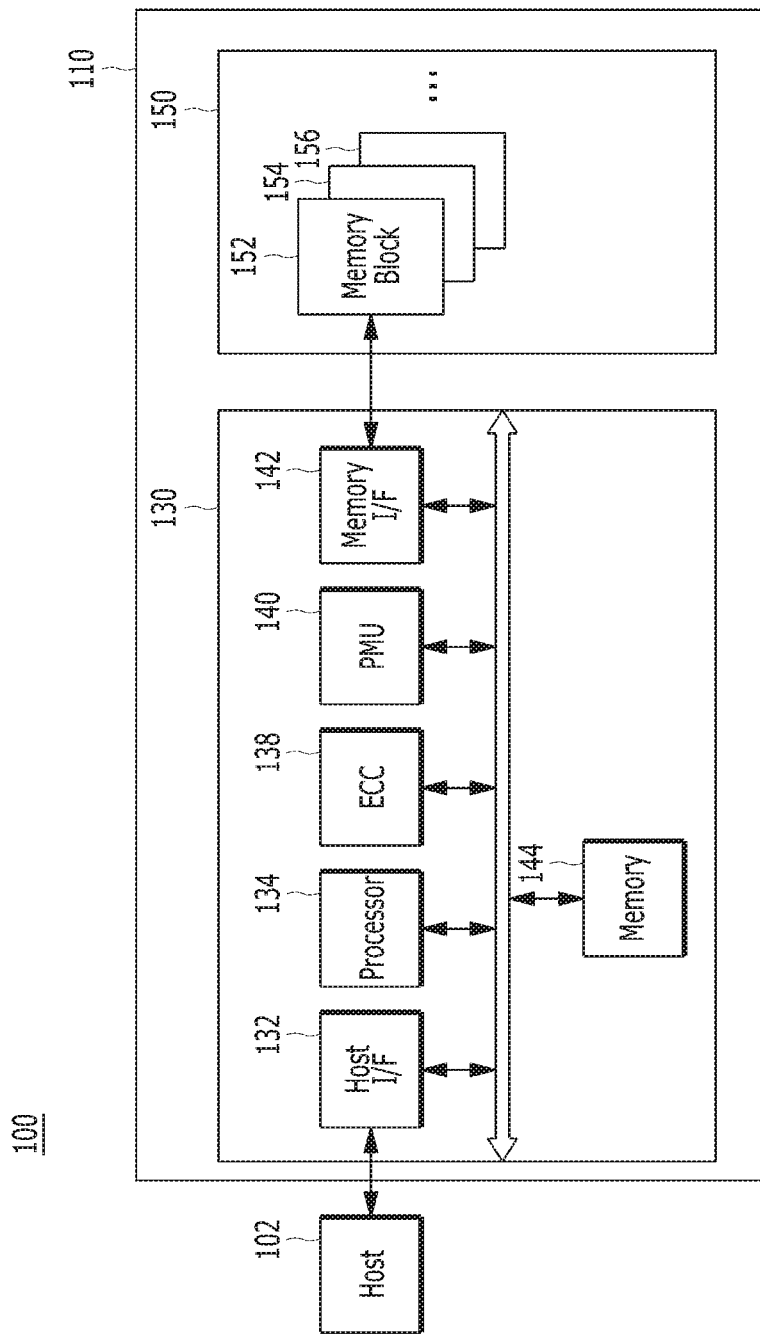
FIG. 1 is a block diagram illustrating a data processing system including a memory system in accordance with an embodiment of the present invention.

Various embodiments of the invention are described below in more detail with reference to the accompanying drawings. We note, however, that the invention may be embodied in different other embodiments, forms and variations thereof and should not be construed as being limited to the embodiments set forth herein. Rather, the described embodiments are provided so that this disclosure will be thorough and complete, and will fully convey the invention to those skilled in the art to which this invention pertains. Throughout the disclosure, like reference numerals refer to like parts throughout the various figures and embodiments of the invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the invention.

The drawings are not necessarily to scale and, in some instances, proportions may have been exaggerated to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing specific embodiments only and is not intended to be limiting of the invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the disclosure. It will be further understood that terms, such as those defined in commonly used dictionaries, should be interpreted as having a meaning that is consistent with their meaning in the context of the disclosure and the relevant art and will not be interpreted in an idealized or overly formal sense unless expressly so defined herein.

In the following description, numerous specific details are set forth in order to provide a thorough understanding of the invention. The present invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 including a memory system 110 in accordance with an embodiment of the disclosure.

Referring to FIG. 1, the data processing system 100 may include a host 102 operatively coupled to the memory system 110. The host 102 may be electrically coupled to the memory system 110 via one or more communication channels. The coupling of the host 102 to the memory system 100 may be wireless. The memory system may be permanently or removably coupled to the host 102. The memory system 100 may be embedded into the host 102 or may be externally coupled to the host 102 via a wire or wireless connection.

By the way of example but not limitation, the host 102 may include portable electronic devices such as a mobile phone, MP3 player and laptop computer or non-portable electronic devices such as a desktop computer, a game machine, a TV and a projector.

The memory system 110 may operate to store data for the host 102 in response to a request of the host 102. Non-limited examples of the memory system 110 may include a solid-state drive (SSD), a multi-media card (MMC), a secure digital (SD) card, a universal storage bus (USB) device, a universal flash storage (UFS) device, a compact flash (CF) card, a smart media card (SMC), a personal computer memory card international association (PCMCIA) card and a memory stick. The MMC may include an embedded MMC (eMMC), a reduced size MMC (RS-MMC) and a micro-MMC. The SD card may include a mini-SD card and a micro-SD card.

The memory system 110 may be embodied by various types of storage devices. Non-limited examples of storage devices included in the memory system 110 may include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM) and a flash memory. The flash memory may have a 3-dimensional (3D) stack structure.

The memory system 110 may include a memory device 150 and a controller 130. The memory device 150 may store data for the host 120. The controller 130 may control data storage into the memory device 150.

The controller 130 and the memory device 150 may be integrated into a single semiconductor device, which may be included in the various types of memory systems as exemplified above.

Non-limited application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation. The memory device 150 may provide data stored therein to the host 102 through a read operation. The memory device 150 may include a plurality of memory dies (not shown), each memory die including a plurality of planes (not shown), each plane including a plurality of memory blocks 152 to 156. Each of the memory blocks 152 to 156 may include a plurality of pages. Each of the pages may include a plurality of memory cells coupled to a word line.

The controller 130 may control the memory device 150 in response to a request from the host 102. By the way of example but not limitation, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) unit 132, a processor 134, an error correction code (ECC) unit 138, a Power Management Unit (PMU) 140, a NAND flash controller (NFC) 142 and a memory 144. Each of components may be electrically coupled, or engaged with, each other via an internal bus.

The host interface unit 132 may be configured to process a command and data of the host 102, and may communicate with the host 102 under one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (DATA), enhanced small disk interface (ESDI) and integrated drive electronics (IDE).

The ECC unit 138 may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success or fail signal. When the number of error bits is more than a threshold value of correctable error bits, the ECC unit 138 may not correct the error bits to output the error correction fail signal.

The ECC unit 138 may perform error correction through a coded modulation such as Low Density Parity Check (LDDC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices for error correction.

The PMU 140 may manage an electrical power used and provided in the controller 130.

The NFC 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the NFC 142 may generate a control signal for the memory device 150 to process data entered into the memory device 150 by the processor 134. The NFC 142 may work as an interface (e.g., a NAND flash interface) for processing a command and data between the controller 130 and the memory device 150. Specifically, the NFC 142 may support data transmission between the controller 130 and the memory device 150.

The memory 144 may serve as a working memory of the memory system 110 and the controller 130. The memory 144 may store data supporting operation of the memory system 110 and the controller 130. The controller 130 may control the memory device 150 so that read, write, program and erase operations are performed in response to a request from the host 102. The controller 130 may output data read from the memory device 150 to the host 102, and may store data provided from the host 102 into the memory device 150. The memory 144 may store data required for the controller 130 and the memory device 150 to perform these operations.

The memory 144 may be embodied by a volatile memory. By the way of example but not limitation, the memory 144 may be embodied by a static random access memory (SRAM) or a dynamic random access memory (DRAM). The memory 144 may be disposed within or out of the controller 130. FIG. 1 exemplifies an example of the memory 144 disposed within the controller 130. In another embodiment, the memory 144 may be embodied by an external volatile memory having a memory interface transferring data between the memory 144 and the controller 130.

The processor 134 may control the overall operations of the memory system 110. The processor 134 may use a firmware to control overall operations of the memory system 110. The firmware may be referred to as a flash translation layer (FTL).

The processor 134 of the controller 130 may include a management unit (not illustrated) for performing a bad management operation of the memory device 150. The management unit may perform a bad block management operation of checking a bad block among the plurality of memory blocks 152 to 156 included in the memory device 150. The bad block may include a block where a program fail occurs during a program operation, due to the characteristic of a NAND flash memory. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Figure 2:
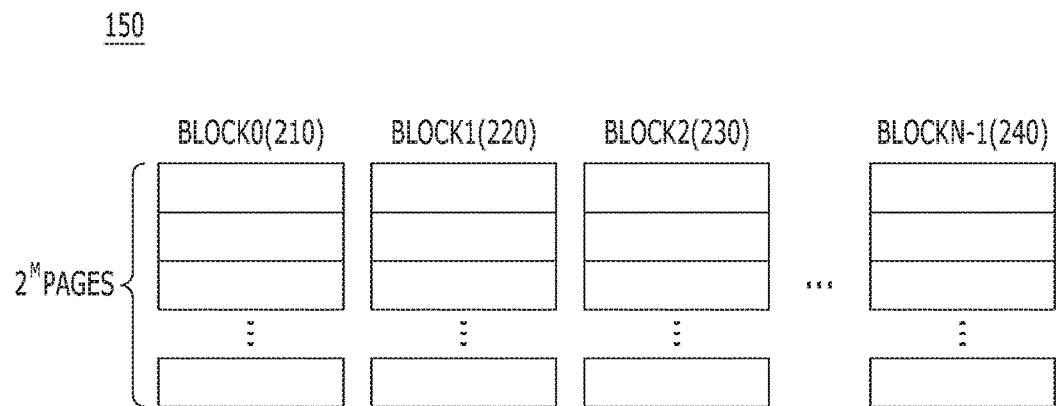
FIG. 2 is a schematic diagram illustrating an exemplary configuration of a memory device employed in the memory system shown in FIG. 1.

FIG. 2 is a schematic diagram illustrating the memory device 150.

Referring to FIG. 2, the memory device 150 may include a plurality of memory blocks 0 to N−1, and each of the blocks 0 to N−1 may include a plurality of pages, for example, $2^M$ pages, the number of which may vary according to circuit design. Memory cells included in the respective memory blocks 0 to N−1 may be one or more of a single level cell (SLC) storing 1-bit data, or a multi-level cell (MLC) storing 2- or more bit data. In an embodiment, the memory device 150 may include a plurality of triple level cells (TLC) each storing 3-bit data. In another embodiment, the memory device may include a plurality of quadruple level cells (QLC) each storing 4-bit level cell.

Figure 3:
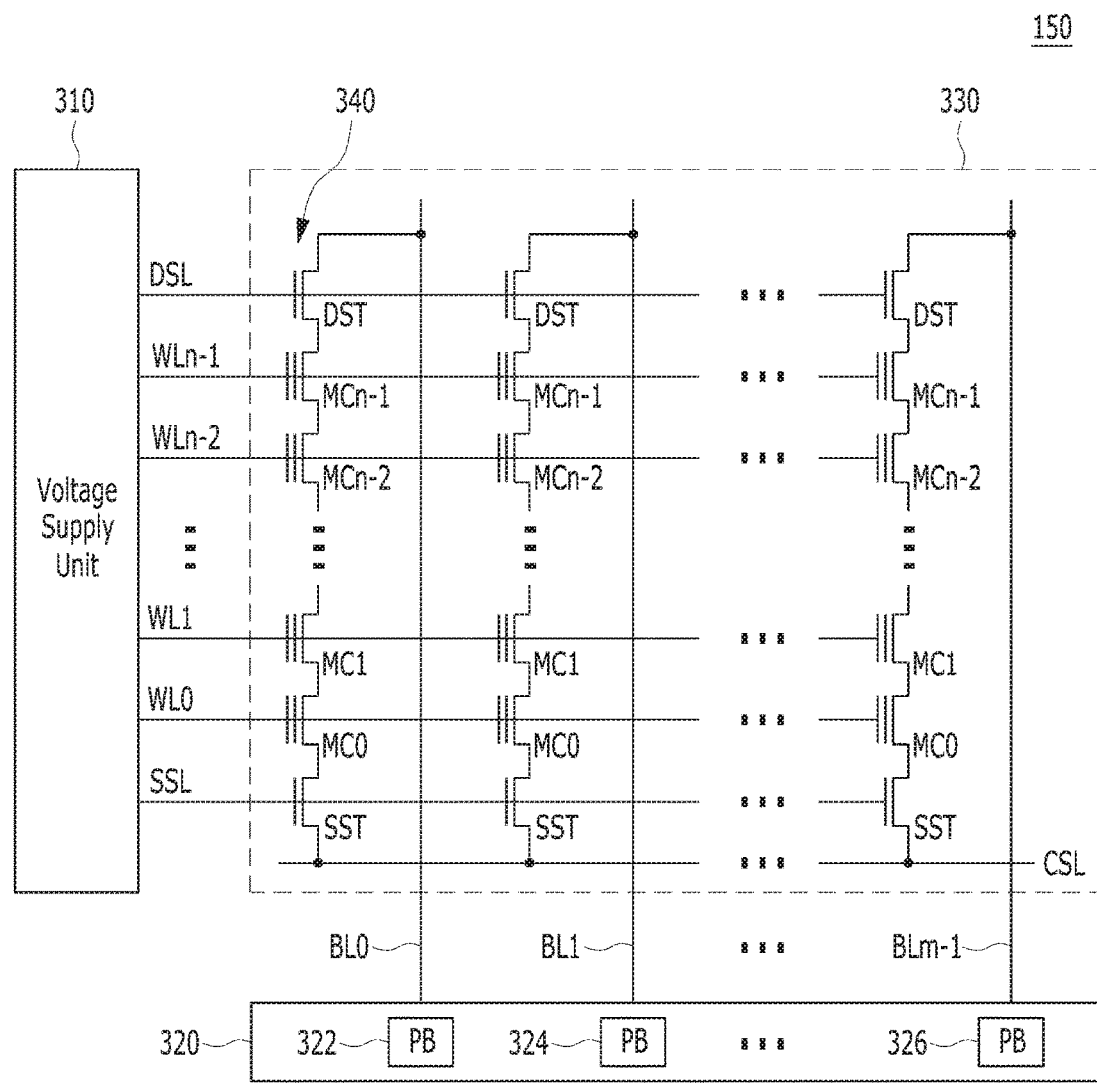
FIG. 3 is a circuit diagram illustrating an exemplary configuration of a memory cell array of a memory block in the memory device shown in FIG. 2.

FIG. 3 is a circuit diagram illustrating an exemplary configuration of a memory cell array of a memory block in the memory device 150.

Referring to FIG. 3, a memory block 330 which may correspond to any of the plurality of memory blocks 152 to 156 included in the memory device 150 of the memory system 110 may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST, SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not illustrated). Under the control of the control circuit, the voltage supply unit 310 may select one of the memory blocks (or sectors) of the memory cell array, select one of the word lines of the selected memory block, and provide the word line voltages to the selected word line and the unselected word lines as may be needed.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and may supply a current or a voltage onto bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

Figure 4:
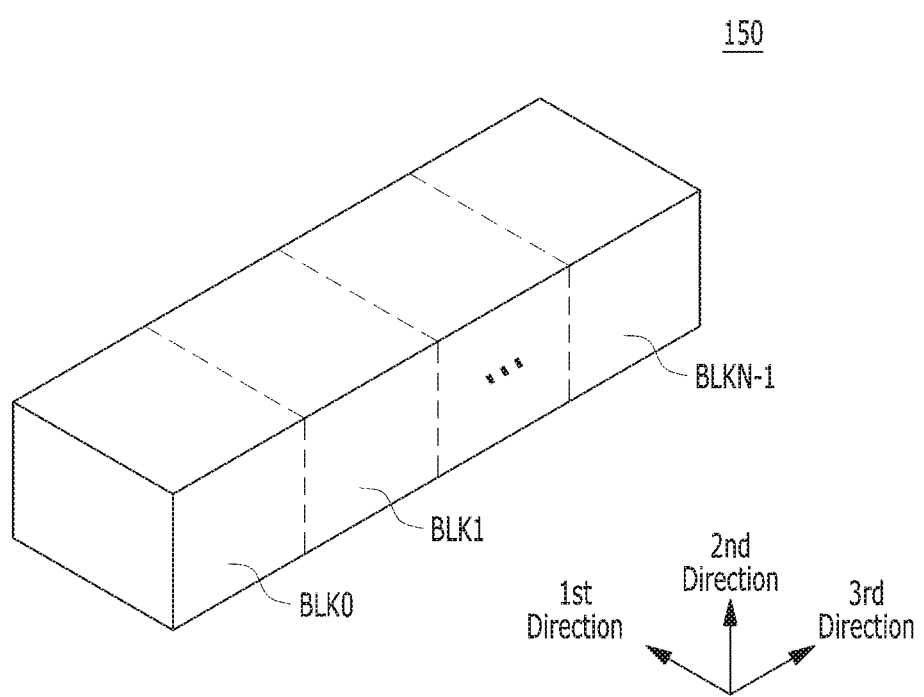
FIG. 4 is a schematic diagram illustrating an exemplary three-dimensional structure of the memory device shown in FIG. 2.

FIG. 4 is a schematic diagram illustrating an exemplary 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each having a 3D structure (or vertical structure).

Figure 5C:
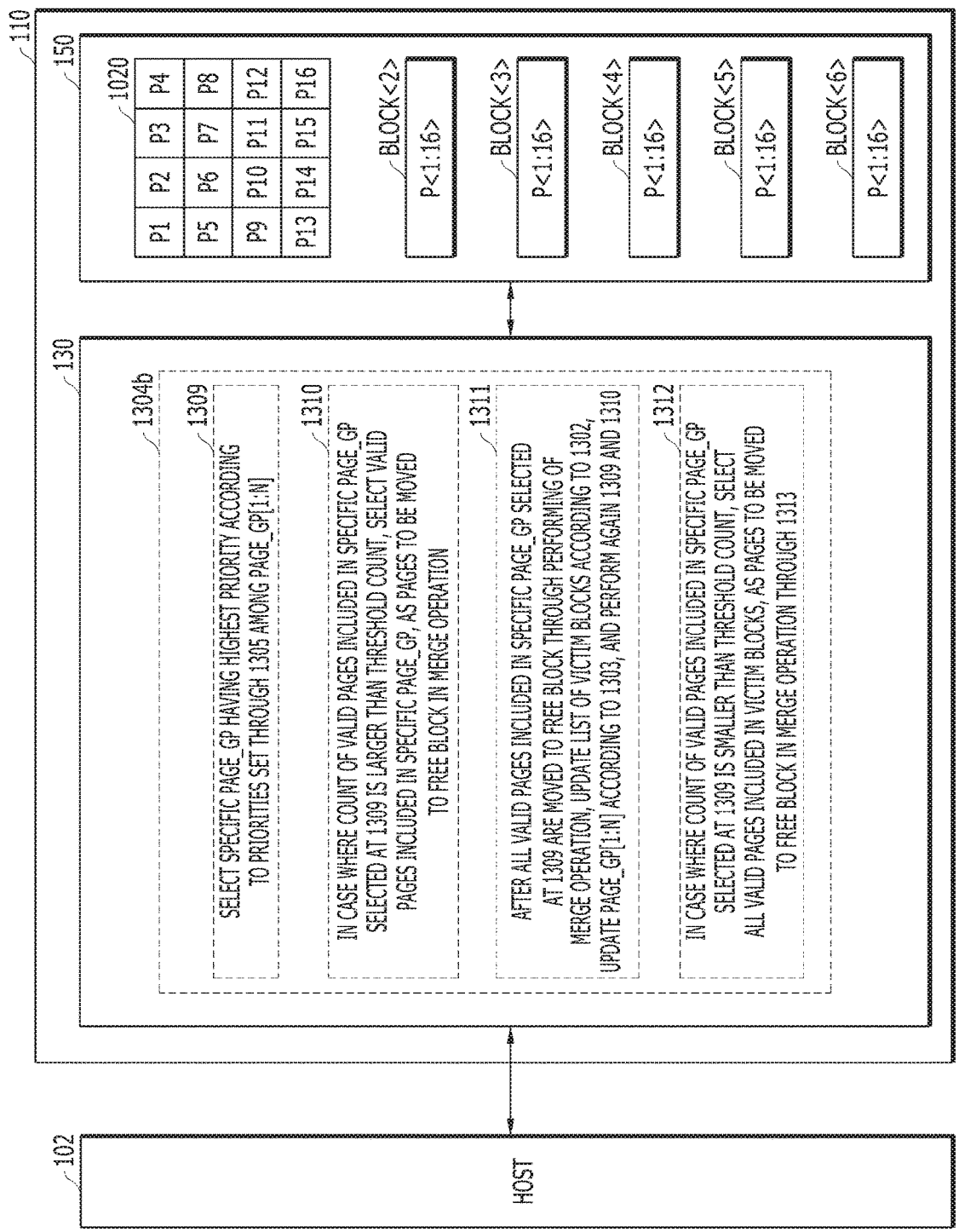

FIGS. 5A to 5C are diagrams illustrating a representation of an example of a memory system in accordance with an embodiment of the disclosure.

FIGS. 6A to 6C are representations of examples of diagrams to assist in the explanation of the operation of the memory system in accordance with the embodiment of the disclosure shown in FIGS. 5A to 5C.

Referring to FIGS. 5A to 5C, it may be seen that, by referring to the configuration of the data processing system 100 shown in FIG. 1, there is illustrated the configuration of a data processing system 100 including a host 102 and a memory system 110.

As described above with reference to FIG. 1, the memory system 110 includes a controller 130 and a nonvolatile memory device 150.

The nonvolatile memory device 150 includes a plurality of memory blocks BLOCK<1:6> as described above with reference to FIG. is 1. The memory blocks BLOCK<1:6> include a plurality of pages P<1:16> OF THE PLURAL BLOCKS BLOCK<1:6>.

For reference, while a configuration in which only one nonvolatile memory device 150 is included in the memory system 110 is illustrated in FIGS. 5A to 5C, this is only for the sake of convenience in explanation. A larger number of nonvolatile memory devices may be included practically. Also, while a configuration in which six memory blocks BLOCK<1:6> are included in the nonvolatile memory device 150 is illustrated in FIGS. 5A to 5C, this is only for the sake of convenience in explanation, and a larger number of memory blocks may be included practically. Moreover, while a configuration in which 16 pages P<1:16> are included in each of the memory blocks BLOCK<1:6> is illustrated, this is only for the sake of convenience in explanation, and a larger number of pages may be included practically.

While it is illustrated in FIG. 5 that a host interface 132, a processor 134, an ECC unit 138, a power management unit 140, a NAND flash controller 142 and a memory 144 which are illustrated in FIG. 1 as being included in a controller 130 are not included in the controller 130, these components are omitted from the drawing for the sake of convenience in explanation, but may be practically included in the controller 130.

Referring to FIG. 5A, the nonvolatile memory device 150 includes the plurality of memory blocks BLOCK<1:6>, each including the plurality of pages P<1:16> OF THE PLURAL BLOCKS BLOCK<1:6>.

A plurality of data DATA<1:P> may be written in the plurality of pages P<1:16> of BLOCK<1:6> included in the nonvolatile memory device 150 according to a write request from the host 102. The controller 130 may assign or add tags TAG[1:N] to each of the data DATA<1:P> stored in the pages P<1:16> of BLOCK<1:6> (operation 1301). The tags TAG[1:N] are indicators showing N number of classifications regarding the usage pattern. Each of P and N is a natural number of 2 or greater.

For example, making descriptions with additional reference to FIG. 6A, it may be assumed that, when first to fourth data DATA<1:4> are write-requested from the host 102, the usage patterns of the first data DATA<1> and the second data DATA<2> correspond to a first tag TAG[1], the usage pattern of the third data DATA<3> corresponds to a second tag TAG[2], and the usage pattern of the fourth data DATA<4> corresponds to a third tag TAG[3].

In this case, when storing the first data DATA<1> in the first page P1 of the first memory block BLOCK<1>, the controller 130 may assign a value 'A' to the first tag TAG[1] corresponding to the first data DATA<1> stored in the first page P1. Similarly, when storing the second data DATA<2> in the second page P2 of the first memory block BLOCK<1>, the controller 130 may assign the value 'A' to the first tag TAG[1] corresponding to the second data DATA<2> stored in the second page P2. Similarly, when storing the third data DATA<3> in the tenth page P10 of the first memory block BLOCK<1>, the controller is 130 may give a value 'B' to the second tag TAG[2] corresponding to the third data DATA<3> stored in the tenth page P10. Similarly, when storing the fourth data DATA<4> in the thirteenth page P13 of the first memory block BLOCK<1>, the controller 130 may assign a value 'C' to the third tag TAG[3] corresponding to the fourth data DATA<4> stored in the thirteenth page P13.

The controller 130 may generate the N kinds of tags TAG[1:N] and assign one of them to the data DATA<1:P>, respectively, depending on a result of analyzing the usage patterns of the respective data DATA<1:P> which are applied from the host 102 (operation 1320). The N kinds of tags TAG[1:N], generated through the operation 1320 and correspond to the data DATA<1:P>, respectively, may be stored together with the data DATA<1:P>, in the pages P<1:16> of plural blocks BLOCK<1:6>, through the operation 1301.

In the case of the operation 1320, components (not shown) for analyzing the usage patterns of the respective data DATA<1:P> may be included in the controller 130. For example, referring to FIG. 1 together, the host interface unit 132 and the processor 134 included in the controller 130 may operate as the components for analyzing the usage patterns of the data DATA<1:P> applied from the host 102.

The controller 130 may receive the data DATA<1:P> and the N kinds of tags TAG[1:N] corresponding to the data DATA<1:P>, respectively, from the host 102 (operation 1330). The N kinds of tags TAG[1:N] are entered from the host 102 through the operation 1330 and correspond to the data DATA<1:P>, respectively. The N kinds of tags TAG[1:N] are stored in the pages P<1:16> of the plural blocks BLOCK<1:6> together with the data DATA<1:P> through the operation 1301.

In the case of the operation 1330, the host 102 may generate the N kinds of tags TAG[1:N] corresponding to the data DATA<1:P>, respectively, depending on the usage patterns of the respective data DATA<1:P>. The host 102 transfers the data DATA<1:P> with the N kinds of tags TAG[1:N] corresponding to the respective data DATA<1:P>, respectively, to the controller 130 (operation 1020).

The operation of the controller 130 in the above-described operation 1320 and the operation of the controller 130 and the host 102 in the above-described operations 1330, 1020 are not compatible with each other, i.e., cannot be performed together. Therefore, any one operation of the operation of the controller 130 in the operation 1320 and the operation of the controller 130 and the host 102 in the operations 1330, 1020 may be selected and performed according to a system configuration or design. In other words, in the case where the operation of the controller 130 in the operation 1320 is selected and performed, the operation of the controller 130 and the host 102 in the operations 1330 and 1020 is not performed. Conversely, in the case where the operation of the controller 130 and the host 102 in the operations 1330, 1020 is selected and performed, the controller 130 may not perform the operation 1320.

The N kinds of tags [1:N] may be defined variously depending on a system requirement and/or a system configuration. The N kinds of tags [1:N] may be stored in the preset spaces of the pages P<1:16> OF THE PLURAL BLOCKS BLOCK<1:6> each through at least one bit.

For example, when it is assumed that the data DATA<1:P> entered from the host 102 are classified into hot data, warm data and cold data, N may be 3. Here, one of 3 different tags TAG[1], TAG[2], Tag[3] may be stored in the pages P<1:16> OF THE PLURAL BLOCKS BLOCK<1:6> together with the data DATA<1:P>.

Similarly, when it is assumed that the data DATA<1:P> entered from the host 102 are classified into L number of kinds in correspondence to K number of workloads performed in the host 102, N may be L and thus L kinds of tags TAG[1:L] may be stored in the pages P<1:16> OF THE PLURAL BLOCKS BLOCK<1:6> together with the data DATA<1:P>. Here, K is a natural number, and L is a natural number equal to or greater than K. By the way of example but not limitation, when assuming that the data DATA<1:P> applied from the host 102 are classified into 6 kinds in correspondence to 2 workloads performed in the host 102, N may be 6 and thus 6 kinds of tags TAG[1:6] may be stored in the pages P<1:16> OF THE PLURAL BLOCKS BLOCK<1:6> together with the data DATA<1:P>.

The controller 130 manages a list of victim blocks as targets of a merge operation, based on the count of the valid pages included in each of the memory blocks BLOCK<1:6>.

For example, making descriptions with additional reference to FIGS. 6A to 6C, when it is assumed that the count of the valid pages included in each of the first to third memory blocks BLOCK<1:3> among the memory blocks BLOCK<1:6> is less than a predetermined count, the first to third memory blocks BLOCK<1:3> may be managed by being included in the list of victim blocks. Also, when it is assumed that the count of the valid pages included in the sixth memory block BLOCK<6> is greater than the predetermined count, the sixth memory block BLOCK<6> is not included in the list of victim blocks. For reference, it may be assumed that the fourth and fifth memory blocks BLOCK<4; 5> among the memory blocks BLOCK<1:6> are free blocks in which no data is stored.

The controller 130 manages the entire valid pages included in victim blocks, by classifying them into N number of page groups PAGE_GP[1:N] depending on the kinds of the tags TAG[1:N] included in the valid pages (operation 1303).

For example, descriptions will be made below with reference to FIG. 6A.

First, total 9 valid pages P1, P2, P3, P6, P10, P12, P13, P14, P15 are included in the first memory block BLOCK<1> which is managed as a victim block. 3 kinds of tags TAG[1:3] are stored together with valid data (not shown) in the valid pages. In detail, a value 'A' indicating the first tag TAG[1] is stored in the first to third pages P1, P2, P3 and the sixth page P6 of the first memory block BLOCK<1>. A value 'B' is indicating the second tag TAG[2] is stored in the tenth page P10 and the twelfth page P12. A value 'C' indicating the third tag TAG[3] is stored in the thirteenth to fifteenth pages P13, P14, P15. The remaining pages P4, P5, P7, P8, P9, P11, P16 are invalid pages.

Total 6 valid pages P7, P9, P10, P12, P13, P15 are included in the second memory block BLOCK<2> which is managed as a victim block. The 3 kinds of tags TAG[1:3] are stored together with valid data (not shown) in the valid pages. In detail, the value 'A' indicating the first tag TAG[1] is stored in the seventh page P7 and the tenth page P10 of the second memory block BLOCK<2>. The value 'B' indicating the second tag TAG[2] is stored in the ninth page P9 and the twelfth page P12. The value 'C' indicating the third tag TAG[3] is stored in the thirteenth page P13 and the fifteenth pages P15. The remaining pages P1, P2, P3, P4, P5, P6, P8, P11, P14, P16 are invalid pages.

Total 9 valid pages P1, P2, P3, P4, P5, P6, P10, P12, P15 are included in the third memory block BLOCK<3> which is managed as a victim block. The three kinds of tags TAG[1:3] are stored together with valid data (not shown) in the valid pages. In detail, the value 'A' indicating the first tag TAG[1] is stored in the first to fifth pages P1, P2, P3, P4, P5 of the third memory block BLOCK<3>. The value 'B' indicating the second tag TAG[2] is stored in the sixth page P6, the tenth page P10 and the twelfth page P12. The value 'C' indicating the third tag TAG[3] is stored in the fifteenth page P15. The remaining pages P7, P8, P9, P11, P13, P14, P16 are invalid pages.

In this way, total 24 valid pages BLOCK<1>[P1, P2, P3, P6, P10, P12, P13, P14, P15], BLOCK<2>[P7, P9, P10, P12, P13, P15] and BLOCK<3>[P1, P2, P3, P4, P5, P6, P10, P12, P15] are included in the first to third memory blocks BLOCK<1:3> which are managed as victim blocks. Any one tag among the 3 kinds of tags TAG[1:3] is stored together in each of the entire valid pages [P1, P2, P3, P6, P10, P12, P13, P14, P15] at BLOCK<1>, [P7, P9, P10, P12, P13, P15] at BLOCK<2>[P1, P2, P3, P4, P5, P6, P10, P12, P15] at BLOCK<3> included in the first to third memory blocks BLOCK<1:3> which are managed as victim blocks.

In this state, the controller 130 classifies and manages the first to third pages P1, P2, P3 and the sixth page P6 of the first memory block BLOCK<1>, the seventh page P7 and the tenth page P10 of the second memory block BLOCK<2> and the first to fifth pages P1, P2, P3, P4, P5 of the third memory block BLOCK<3> in which the value 'A' indicating the first tag TAG[1] is stored, as a first page group PAGE_GP[1].

The controller 130 classifies and manages the tenth page P10 and the twelfth page P12 of the first memory block BLOCK<1>, the ninth page P9 and the twelfth page P12 of the second memory block BLOCK<2> and the sixth page P6, the tenth page P10 and the twelfth page P12 of the third memory block BLOCK<3> in which the value 'B' indicating the second tag TAG[2] is stored, as a second page group PAGE_GP[2].

The controller 130 classifies and manages the thirteenth to fifteenth pages P13, P14, P15 of the first memory block BLOCK<1>, the thirteenth page P13 and the fifteenth page P15 of the second memory block BLOCK<2> and the fifteenth page P15 of the third memory block BLOCK<3> in which the value 'C' indicating the third tag TAG[3] is stored, as a third page group PAGE_GP[3].

The controller 130 sets priorities to the N kinds of page groups PAGE_GP[1:N] which are classified and managed through the operation 1303, based on counts of the valid pages included in the respective N kinds of page groups PAGE_GP[1:N] (operation 1305). That is, the controller 130 sets a high priority as the count of the valid pages included in each of the N kinds of page groups PAGE_GP[1:N] is relatively large and sets a low priority as the count of the valid pages included in each of the N kinds of page groups PAGE_GP[1:N] is relatively small (operation 1305).

Figure 11:
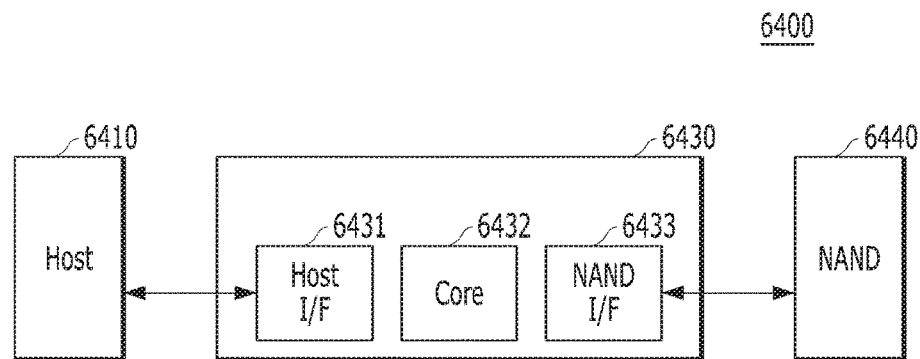

For example, making descriptions with reference to FIG. 6A, 11 valid pages [P1, P2, P3, P6] at BLOCK<1>, [P7, P10] at BLOCK<2>, [P1, P2, P3, P4, P5] at BLOCK<3> are included in the first page group PAGE_GP[1]. 7 valid pages [P10, P12] at BLOCK<1>, [P9, P12] at BLOCK<2>, [P6, P10, P12] at BLOCK<3> are included in the second page group PAGE_GP[2]. 6 valid pages [P13, P14, P15] at BLOCK<1>, [P13, P15] at BLOCK<2>, [P15] at BLOCK<3> are included in the third page group PAGE_GP[3].

Therefore, the first page group PAGE_GP[1] has a highest priority, while the third page group PAGE_GP[3] has a lowest priority. The second page group PAGE_GP[2] has a priority lower than the first page group PAGE_GP[1] and higher than the third page group PAGE_GP[3].

The controller 130 selects valid pages, which would be moved to a free block in a merge operation, among the entire valid pages included in victim blocks, depending on the count of the valid pages included in each of the N number of page groups PAGE_GP[1:N] (operation 1304).

Namely, the controller 130 selects valid pages to be moved to a free block in a merge operation among the entire valid pages included in victim blocks, depending on the priority of each of the N number of page groups PAGE_GP[1:N], which is set through the operation 1305.

The operation 1304 may be implemented as any one operation of a first operation 1304A referring to FIG. 5B and a second operation 1304B referring to FIG. 5C.

First, referring to FIG. 5B, in the first operation 1304a of the operation 1304, the controller 130 selects valid pages to be moved to a free block in a merge operation among all the valid pages included in victim blocks, before performing the merge operation, and determines a moving sequence of the selected valid pages in advance before performing the merge operation. Then, when performing the merge operation, the controller 130 moves the selected valid pages to a free block according to the moving sequence determined in advance.

In detail, the controller 130 sequentially selects one by one M number of page groups PAGE_GP[1:M] of which counts of valid pages are equal to or greater than a threshold count, among the N number of page groups PAGE_GP[1:N], according to the priorities set through the operation 1305 (operation 1306). Here, N is a total number of page groups while M is the number of page groups where a given number or more of valid pages exist.

In this way, as the M number of page groups PAGE_GP [1:M] are sequentially selected one by one by the unit of page group PAGE_GP[x] through the operation 1306, the controller 130 selects the valid pages included in a selected page group PAGE_GP[x], as pages to be moved to a free block in a merge operation (operation 1307).

When selecting valid pages to be moved to a free block in a merge operation through the operation 1306 and the operation 1307, the controller 130 may divide the entire valid pages, included in victim blocks, by the unit of page group PAGE_GP[x] to select some of the entire valid pages to be moved into a free block.

If the respective counts of the valid pages included in the N number of page groups PAGE_GP[1:N] are equal to or greater than the threshold count, that is, N and M are the same with each other, the controller 130 may move the entire valid pages, included in victim blocks, to a free block through a merge operation by dividing all the entire valid pages by the unit of page group PAGE_GP[x].

However, if the counts of the valid pages included in one or more remaining page groups PAGE_GP[M+1:N] among the N number of page groups PAGE_GP[1:N] are less than the threshold count, that is, M is less than N, after the valid pages included in the victim blocks BLOCK<1:3> are moved to a free block by being divided by the unit of page group PAGE_GP[x], through performing a merge operation by the controller 130, the valid pages included in the remaining page groups PAGE_GP[M+1:N] are in a state in which they are not moved to a free block.

In this case, the controller 130 in accordance with the embodiment of the present disclosure may selectively perform an operation of allowing the valid pages included in the remaining page groups PAGE_GP[M+1:N] not to be moved to a free block and an operation of not allowing the valid pages included in the remaining page groups PAGE_GP[M+ 1:N] not to be moved to a free block.

It is assumed that the valid pages included in the remaining page groups PAGE_GP[M+1:N] are not allowed to be moved to a free block. For selecting valid pages to be moved to a free block in a merge operation, the controller 130 may divide the entire valid pages included in the M number of page groups PAGE_GP[1:M] by the unit of page group PAGE_GP[x] through the above-described operations 1306, 1307. When the count of the valid pages included in one or more remaining page groups PAGE_GP[M+1:N] among the N number of page groups PAGE_GP[1:N] is less than the threshold count, that is, M is less than N, after, the controller 130 selects the valid pages included in the remaining page groups PAGE_GP[M+1:N], as pages to be moved to a free block in the merge operation, by using a method according to an operation 1313 to be described below (operation 1308).

When the controller 130 selects valid pages to be moved to a free block in a merge operation, the operation 1313 performed by the controller 130 may include, selecting victim blocks one by one by the unit of block, and then selecting the valid pages included in a selected victim block, as pages to be moved to a free block.

In detail, in the operation 1313, the controller 130 sets the priorities of respective victim blocks, managed through the operation 1302, based on the counts of the valid pages included in the victim blocks, and sequentially selects the victim blocks one by one according to the set priorities (operation 1314).

In this way, if the victim blocks are sequentially selected one by one by the unit of block through the operation 1314, the controller 130 selects the valid pages included in a selected victim block, as pages to be moved to a free block in a merge operation (operation 1315).

Conversely, in the case of performing the operation of allowing the valid pages included in the remaining page groups PAGE_GP[M+1:N] not to be moved to a free block, after selecting pages to be moved to a free block in a merge operation, by dividing the entire valid pages included in M number of page groups PAGE_GP[1:M] by the unit of page group PAGE_GP[x] through the above-described operations 1306, 1307, the controller 130 does not perform the operation 1308.

Summarizing these, when the remaining page groups PAGE_GP[M+1:N], which are not selected as pages to be moved to a free block in a merge operation through the operation 1306 and the operation 1307, exist, the controller 130 may select the valid pages included in the remaining page groups PAGE_GP[M+1:N], as pages to be moved to a free block in a merge operation, by performing the operation 1313 through the operation 1308. Also, the controller 130 may not select the valid pages included in the remaining page groups PAGE_GP[M+1:N], as pages to be moved to a free block in a merge operation, by not performing the operation 1308.

For example, making descriptions with additional reference to 'A' of FIG. 6A to explain the operation 1306 and the operation 1307, 11 valid pages [P1, P2, P3, P6] at BLOCK<1>, [P7, P10] at BLOCK<2>, [P1, P2, P3, P4, P5] at BLOCK<3> are included in the first page group PAGE_GP[1]. 7 valid pages [P10, P12] at BLOCK<1>, [P9, P12] at BLOCK<2>, [P6, P10, P12] at BLOCK<3> are included in the second page group PAGE_GP[2]. 6 valid pages [P13, P14, P15] at BLOCK<1>, [P13, P15] at BLOCK<2>, [P15] at BLOCK<3> are included in the third page group PAGE_GP[3].

When assuming that the threshold count is 7, each of the first and second page groups PAGE_GP[1:2] among the first to third page groups PAGE_GP[1:3] includes valid pages of which count is equal to or greater than the threshold count, but the third page group PAGE_GP[3] includes valid pages of which count is less than the threshold count.

Therefore, through the operation 1306, the controller 130 sequentially selects the first and second page groups PAGE_GP[1:2] among the first to third page groups PAGE_GP[1:3]. Because the first page group PAGE_GP[1] is set through the operation 1305 to have a higher priority than the second page group PAGE_GP[2], the controller 130 selects the first page group PAGE_GP[1] first, and then selects the second page group PAGE_GP[2] later.

In this way, if the first page group PAGE_GP[1] is selected through the operation 1306, the controller 130 selects the total 11 valid pages [P1, P2, P3, P6] at BLOCK<1>, [P7, P10] at BLOCK<2>, [P1, P2, P3, P4, P5] at BLOCK<3> included in the first page group PAGE_GP[1], as pages to be moved to a free block in a merge operation, through the operation 1307.

Also, if the second page group PAGE_GP[2] is selected following the first page group PAGE_GP[1] through the operation 1306, the controller 130 selects the total 7 valid pages [P10, P12] at BLOCK<1>, [P9, P12] at BLOCK<2>, [P6, P10, P12] at BLOCK<3> included in the second page group PAGE_GP[2], as pages to be moved to a free block in a merge operation, through the operation 1307.

In other words, through the operation 1306 and the operation 1307, the controller 130 selects the total 11 valid pages [P1, P2, P3, P6] at BLOCK<1>, [P7, P10] at BLOCK<2>, [P1, P2, P3, P4, P5] at BLOCK<3> included in the first page group PAGE_GP[1] as well as the total 7 valid pages [P10, P12] at BLOCK<1>, [P9, P12] at BLOCK<2>, [P6, P10, P12] at BLOCK<3> included in the second page group PAGE_GP[2], as pages to be moved to a free block in the merge operation, by the unit of sequential page group PAGE_GP[x].

In this way, when selecting, through the operation 1306 and the operation 1307, valid pages to be moved to a free block in a merge operation, after selecting the valid pages included in the first page group PAGE_GP[1] and the second page group PAGE_GP[2] by the unit of page group PAGE_GP[x], the controller 130 may select the valid pages [P13, P14, P15] at BLOCK 1>, [P13, P15] at BLOCK<2>, [P15] at BLOCK<3> included in the third page group PAGE_GP[3] not selected through the operation 1306, as pages to be moved to a free block in the merge operation by the unit of sequential block by using the method according to the operation 1313 through the operation 1308. The controller 130 may not select the valid pages [P13, P14, P15] at BLOCK<1>, [P13, P15] at BLOCK<2>, [P15] at BLOCK<3> included in the third page group PAGE_GP[3] not selected through the operation 1306, as pages to be moved to a free block in the merge operation.

For example, additionally referring to 'A' of FIG. 6C to explain the operation 1308, the count of the total 6 valid pages [P13, P14, P15] at BLOCK<1>, [P13, P15] at BLOCK<2>, [P15] at BLOCK<3> included in the third page group PAGE_GP[3] not selected in the operation 1306 is less than 7 as the threshold count.

Thus, through the operation 1314 of the operation 1313, the controller 130 sets the priorities of the respective victim blocks BLOCK<1:3> corresponding to the third page group PAGE_GP[3], based on the counts of the valid pages included in the victim blocks BLOCK<1:3>, and then sequentially selects the victim blocks BLOCK<1:3> one by one according to the set priorities.

In detail, among the victim blocks BLOCK<1:3> corresponding to the third page group PAGE_GP[3], there are six valid pages: 3 valid pages [P13, P14, P15] at the first memory block BLOCK<1>, 2 valid pages [P13, P15] at the second memory block BLOCK<2>, and 1 valid page [P15] at the third memory block BLOCK<3> includes.

Therefore, the controller 130 sets priorities to the victim blocks BLOCK<1:3> corresponding to the third page group PAGE_GP[3], through the operation 1314 of the operation 1313, such that the first memory block BLOCK<1> has a highest priority, the third memory block BLOCK<3> has a lowest priority and the second memory block BLOCK<2> has a priority lower than the first memory block BLOCK<1> and higher than the third memory block BLOCK<3>.

In this way, if the first memory block BLOCK<1> is selected through the operation 1314 of the operation 1313, the controller 130 selects the total 3 valid pages [P13, P14, P15] included in the first memory block BLOCK<1>, as pages to be moved to a free block in the merge operation, through the operation 1315 of the operation 1313.

Also, if the second memory block BLOCK<2> is selected following the first memory block BLOCK<1> through the operation 1314 of the operation 1313, the controller 130 selects the total 2 valid pages [P13, P15] included in the second memory block BLOCK<2>, as pages to be moved to a free block in the merge operation, through the operation 1315 of the operation 1313.

Moreover, if the third memory block BLOCK<3> is selected following the second memory block BLOCK<2> through the operation 1314 of the operation 1313, the controller 130 selects the total one valid page [P15] included in the third memory block BLOCK<3>, as a page to be moved to a free block in the merge operation, through the operation 1315 of the operation 1313.

Summarizing these, before performing a merge operation, in the first operation 1304a of the operation 1304, the controller 130 selects the total 11 valid pages [P1, P2, P3, P6] at BLOCK<1>, [P7, P10] at BLOCK<2>, [P1, P2, P3, P4, P5] at BLOCK<3> included in the first page group PAGE_GP[1] which includes valid pages equal to or greater than 7 as the threshold count and the total 7 valid pages [P10, P12] at BLOCK<1>, [P9, P12] at BLOCK<2>, [P6, P10, P12] at BLOCK<3> included in the second page group PAGE_GP[2] which includes valid pages equal to or greater than 7 as the threshold count, as pages to be moved to a free block in a merge operation, by the unit of sequential page group PAGE_GP[x], through the operation 1306 and the operation 1307. Thereafter, the 6 valid pages [P13, P14, P15] at BLOCK<1>, [P13, P15] at BLOCK<2>, [P15] BLOCK<3> included in the third page group PAGE_GP[3] which includes valid pages less than 7 as the threshold count may be selected as pages to be moved to a free block in a merge operation, by the unit of sequential block, through performing the operation 1308. Or, the 6 valid pages may not be selected as pages to be moved to a free block in a merge operation, through not performing the operation 1308.

In the case where the operation 1308 is not performed, after determining a sequence in which some valid pages [P1, P2, P3, P6, P10, P12] at BLOCK<1>, [P7, P10, P9, P12] at BLOCK<2>, [P1, P2, P3, P4, P5, P6, P10, P12] at BLOCK<3> among the entire valid pages [P1, P2, P3, P6, P10, P12, P13, P14, P15] at BLOCK<1>, [P7, P9, P10, P12, P13, P15] at BLOCK<2>, [P1, P2, P3, P4, P5, P6, P10, P12, P15] at BLOCK<3> included in the victim blocks BLOCK<1:3> are to be moved to a free block in a merge operation, through the operation 1306 and the operation 1307, the controller 130 performs a merge operation and moves the valid pages [P1, P2, P3, P6, P10, P12] at BLOCK<1>, [P7, P10, P9, P12] at BLOCK<2>, [P1, P2, P3, P4, P5, P6, P10, P12] at BLOCK<3> of the victim blocks BLOCK<1:3> of which sequence is determined, to a free block.

In the case where the operation 1308 is performed, the controller 130 determines a sequence in which the entire valid pages [P1, P2, P3, P6, P10, P12, P13, P14, P15] at BLOCK<1>, [P7, P9, P10, P12, P13, P15] at BLOCK<2>, [P1, P2, P3, P4, P5, P6, P10, P12, P15] at BLOCK<3> included in the victim blocks BLOCK<1:3> are to be moved to a free block in a merge operation, through the operation 1306 to the operation 1308. The controller 130 performs a merge operation and moves the entire valid pages [P1, P2, P3, P6, P10, P12, P13, P14, P15] at BLOCK<1>, [P7, P9, P10, P12, P13, P15] at BLOCK<2>, [P1, P2, P3, P4, P5, P6, P10, P12, P15] at BLOCK<3> included in the victim blocks BLOCK<1:3>, to a free block.

For example, referring to FIG. 6A, by performing a merge operation, the controller 130 moves the total 11 valid pages [P1, P2, P3, P6] at BLOCK<1>, [P7, P10] at BLOCK<2>, [P1, P2, P3, P4, P5] at BLOCK<3> included in the first page group PAGE_GP[1] selected through the operation 1306 and the operation 1307, to the fourth memory block BLOCK<4> as a free block.

Then, referring to FIG. 6B, by continuously performing the merge operation, the controller 130 moves the total 7 valid pages [P10, P12] at BLOCK<1>, [P9, P12] at BLOCK<2>, [P6, P10, P12] at BLOCK<3> included in the second page group PAGE_GP[2] selected through the operation 1306 and the operation 1307, to the fourth memory block BLOCK<4> and the fifth memory block BLOCK<5> as free blocks.

In the case where the operation 1308 is not performed, the controller 130 completes the performing of the merge operation after performing the merge operation described above with reference to FIGS. 6A and 6B.

In the case where the operation 1308 is performed, after performing the merge operation described above with reference to FIGS. 6A and 6B, the controller 130 performs the merge operation to be described below with reference to FIG. 6C, thereby completing the performing of the merge operation.

For example, referring to FIG. 6C, by continuously performing the merge operation, the controller 130 moves the 3 valid pages [P13, P14, P15] included in the first memory block BLOCK<1> selected through the operation 1308, to the fifth memory block BLOCK<5> as a free block.

Then, referring to FIG. 6C, by continuously performing the merge operation, the controller 130 moves the 2 valid pages [P13, P15] included in the second memory block BLOCK<2> selected through the operation 1308, to the fifth memory block BLOCK<5> as a free block.

In succession, referring to FIG. 6C, by continuously performing the merge operation, the controller 130 moves the 1 valid pages [P15] included in the third memory block BLOCK<3> selected through the operation 1308, to the fifth memory block BLOCK<5> as a free block.

For reference, even though the controller 130 determines in advance a sequence in which the valid pages included in victim blocks are to be moved to a free block, before performing a merge operation, through the first operation 1304a of the operation 1304, it is not that all the valid pages of which moving sequence is determined in advance should be moved to a free block when performing a merge operation. Namely, it is also possible all the way to move only some valid pages among valid pages of which moving sequence is determined in advance, to a free block in a merge operation, according to a determination of the controller 130 depending on the influence of various environments.

For example, after, through the operation 1306 and the operation 1307, the valid pages included in the first and second page groups PAGE_GP[1:2] are selected as pages to be moved to a free block in a merge operation, in the case where it is determined at a time when the merge operation is performed and the valid pages included in the first page group PAGE_GP[1] are moved to the free block by the unit of page group that a time for the controller 130 to further perform the merge operation is insufficient, it is possible all the way to not move the valid pages included in the second page group PAGE_GP[2] selected in advance through the operation 1306 and the operation 1307, to a free block, and end the merge operation as it is.

Referring to FIG. 5C, in the second operation 1304*b* of the operation 1304, after selecting some valid pages to be moved to a free block in a merge operation among the entire valid pages included in victim blocks, before performing the merge operation, the controller 130 does not additionally select pages to be moved to a free block in the merge operation until the merge operation is actually performed and the selected valid pages are actually moved to the free block. Of course, after the merge operation is performed and the selected valid pages are moved to the free block, some pages to be moved to a free block in a merge operation are selected again among the entire valid pages included in victim blocks, and the controller 130 waits for the merge operation to be actually performed.

In detail, the controller 130 selects a specific page group which has a highest priority set through the operation 1305, among the N number of page groups PAGE_GP[1:N] (operation 1309).

In the case where the count of the valid pages included in the specific page group selected through the operation 1309 is equal to or greater than the threshold count, the controller 130 selects the valid pages included in the specific page group, as pages to be moved to a free block in a merge operation (operation 1310).

In this way, if one specific page group is selected among the N number of page groups PAGE_GP[1:N] through the operation 1310, the controller 130 moves all the valid pages included in the specific page group, to a free block, updates the list of victim blocks according to the operation 1302, updates the N number of page groups according to the operation 1303 based on an updated list of victim blocks, and selects again valid pages to be moved to a free block in a merge operation to be successively performed, via the operation 1309 and the operation 1310 (operation 1311).

In the case where the count of the valid pages included in the specific page group selected through the operation 1309 is less than the threshold count, the controller 130 may select the entire valid pages included in victim blocks, as pages to be moved to a free block in a merge operation, by using the method according to the operation 1313 through an operation 1312, or may not select the entire valid pages included in victim locks, as pages to be moved to a free block in a merge operation.

For example, making descriptions with additional reference to 'B' of FIG. 6A, 'B' of FIG. 6B and 'B' of FIG. 6C to explain the operations 1309 to 1312, total 11 valid pages [P1, P2, P3, P6] at BLOCK<1>, [P7, P10] at BLOCK<2>, [P1, P2, P3, P4, P5] at BLOCK<3> are included in the first page group PAGE_GP[1]. Total 7 valid pages [P10, P12] at BLOCK<1>, [P9, P12] at BLOCK<2>, [P6, P10, P12] at BLOCK<3> are included in the second page group PAGE_GP[2]. Total 6 valid pages [P13, P14, P15] at BLOCK<1>, [P13, P15] at BLOCK<2>, [P15] at BLOCK<3> are included in the third page group PAGE_GP[3].

The controller 130 selects the first page group PAGE_GP[1] having a highest priority among the priorities set according to the operation 1305, as a specific page group, through the operation 1309.

Then, the controller 130 checks whether the count of the valid pages included in the first page group PAGE_GP[1] selected as the specific page group in the operation 1309 is equal to or greater than the threshold count, and, according to a checking result, selects the valid pages [P1, P2, P3, P6] at BLOCK<1>, [P7, P10] at BLOCK<2>, [P1, P2, P3, P4, P5] at BLOCK<3> included in the first page group PAGE_GP[1], as pages to be moved to a free block in a merge operation, through the operation 1310.

When assuming that the threshold count is 7, the valid pages [P1, P2, P3, P6] at BLOCK<1>, [P7, P10] at BLOCK<2>, [P1, P2, P3, P4, P5] at BLOCK<3> included in the first page group PAGE_GP[1] selected as the specific page group in the operation 1309 are selected as pages to be moved to a free block in a merge operation, through the operation 1310.

Thereafter, the controller 130 performs the merge operation, and moves the valid pages [P1, P2, P3, P6] at BLOCK<1>, [P7, P10] at BLOCK<2>, [P1, P2, P3, P4, P5] at BLOCK<3> included in the first page group PAGE_GP[1], to the fourth memory block BLOCK<4> as a free block.

After the merge operation is performed in this way, the controller 130 updates the list of the victim blocks BLOCK<1:3> according to the operation 1302 based on the remaining valid pages by excluding the valid pages [P1, P2, P3, P6] at BLOCK<1>, [P7, P10] at BLOCK<2>, [P1, P2, P3, P4, P5] at BLOCK<3> included in the first page group PAGE_GP[1] among the entire valid pages [P1, P2, P3, P6, P10, P12, P13, P14, P15] at BLOCK<1>, [P7, P9, P10, P12, P13, P15] at BLOCK<2>, [P1, P2, P3, P4, P5, P6, P10, P12, P15] at BLOCK<3> included in the victim blocks BLOCK<1:3>. The controller 130 updates the list of the page groups PAGE_GP[1:3] to a list of the page groups PAGE_GP[2:3] according to the operation 1303 based on an updated list of the victim blocks BLOCK<1:3>.

In other words, the updated list of the victim blocks BLOCK<1:3> according to the operation 1302 and the updated list of the page groups PAGE_GP[2:3] according to the operation 1303 are as shown in FIG. 6B. Therefore, there are total 5 valid pages [P10, P12, P13, P14, P15] included in the first memory block BLOCK<1> among the victim blocks BLOCK<1:3>, total 4 valid pages [P9, P12, P13, P15] included in the second memory block BLOCK<2>, and total 4 valid pages [P6, P10, P12, P15] included in the third memory block BLOCK<3>. Accordingly, the first page group PAGE_GP[1] is invalidated, and only the second page group PAGE_GP[2] and the third page group PAGE_GP[3] remain.

Thereafter, the controller 130 selects the second page group PAGE_GP[2] having a highest priority between the priorities set according to the operation 1305, as a specific page group, through performing the operation 1309 again.

Then, the controller 130 checks whether the count of the valid pages included in the second page group PAGE_GP[2] selected as the specific page group in the operation 1309 is equal to or greater than the threshold count. According to a checking result, the controller 130 selects the valid pages [P10, P12] at BLOCK<1>, [P9, P12] at BLOCK<2>, [P6, P10, P12] at BLOCK<3> included in the second page group PAGE_GP[2], as pages to be moved to a free block in a merge operation, through the operation 1310.

When assuming that the threshold count is 7, the valid pages [P10, P12] at BLOCK<1>, [P9, P12] at BLOCK<2>, [P6, P10, P12] at BLOCK<3> included in the second page group PAGE_GP[2] selected as the specific page group in the operation 1309 are selected as pages to be moved to a free block in a merge operation.

Thereafter, the controller 130 performs the merge operation, and moves the valid pages [P10, P12] at BLOCK<1>,

[P9, P12] at BLOCK<2>, [P6, P10, P12] at BLOCK<3> included in the second page group PAGE_GP[2], to the fourth memory block BLOCK<4> and the fifth memory block BLOCK<5> as free blocks.

After the merge operation is performed in this way, the controller 130 updates the list of the victim blocks BLOCK<1:3> according to the operation 1302 based on the remaining valid pages by excluding the valid pages [P10, P12] at BLOCK<1>, [P9, P12] at BLOCK<2>, [P6, P10, P12] at BLOCK<3> included in the second page group PAGE_GP[2] among the entire valid pages [P10, P12, P13, P14, P15] at BLOCK<1>, [P9, P12, P13, P15] at BLOCK<2>, [P6, P10, P12, P15] at BLOCK<3> included in the victim blocks BLOCK<1:3>. The controller 130 updates the list of the page groups PAGE_GP[2:3] to a list of the page group PAGE_GP[3] according to the operation 1303 based on the updated list of the victim blocks BLOCK<1:3>.

In other words, the updated list of the victim blocks BLOCK<1:3> according to the operation 1302 and the updated list of the page group PAGE_GP[3] according to the operation 1303 are as shown in FIG. 6C. Therefore, there are total 3 valid pages [P13, P14, P15] included in the first memory block BLOCK<1> among the victim blocks BLOCK<1:3>, total 2 valid pages [P13, P15] included in the second memory block BLOCK<2>, and total 1 valid page BLOCK<3>[P15] included in the third memory block BLOCK<3>. Accordingly, the second page group PAGE_GP[2] is invalidated, and only the third page group PAGE_GP[3] remains.

Thereafter, the controller 130 selects the third page group PAGE_GP[3] having a highest priority according to the operation 1305, as a specific page group, through performing the operation 1309 again.

Then, the controller 130 checks whether the count of the valid pages included in the third page group PAGE_GP[3] selected as the specific page group in the operation 1309 is equal to or greater than the threshold count, and, according to a checking result, selects the valid pages [P13, P14, P15] at BLOCK<1>, [P13, P15] at BLOCK<2>, at BLOCK<3> included in the third page group PAGE_GP[3], as pages to be moved to a free block in a merge operation, through the operation 1310.

When assuming that the threshold count is 7, the valid pages [P13, P14, P15] at BLOCK<1>, [P13, P15] at BLOCK<2>, [P15] at BLOCK<3> included in the third page group PAGE_GP[3] selected as the specific page group in the operation 1309 cannot be selected as pages to be moved to a free block in a merge operation.

Therefore, the controller 130 may select the valid pages [P13, P14, P15] at BLOCK<1>, [P13, P15] at BLOCK<2>, [P15] at BLOCK<3> included in the third page group PAGE_GP[3] selected as the specific page group in the operation 1309, as pages to be moved to a free block in a merge operation, by the unit of sequential block, by using the method according to the operation 1313 through the operation 1312, and may not select the valid pages [P13, P14, P15] at BLOCK<1>, [P13, P15] at BLOCK<2>, [P15] at BLOCK<3> included in the third page group PAGE_GP [3] selected as the specific page group in the operation 1309, as pages to be moved to a free block in a merge operation.

For example, additionally referring to 'B' of FIG. 6C to explain the operation 1312, the count of the valid pages [P13, P14, P15] at BLOCK<1>, [P13, P15] at BLOCK<2>, [P15] at BLOCK<3> included in the third page group PAGE_GP[3] selected as the specific page group in the operation 1309 is less than 7 as the threshold count.

Thus, through the operation 1314 of the operation 1313, the controller 130 sets the priorities of the respective victim blocks BLOCK<1:3> corresponding to the third page group PAGE_GP[3], based on the counts of the valid pages included in the victim blocks BLOCK<1:3>. Then, the controller 130 sequentially selects the victim blocks BLOCK<1:3> one by one according to the set priorities.

In detail, among the victim blocks BLOCK<1:3> corresponding to the third page group PAGE_GP[3], the first memory block BLOCK<1> includes 3 valid pages [P13, P14, P15], the second memory block BLOCK<2> includes 2 valid pages [P13, P15], and the third memory block BLOCK<3> includes 1 valid page [P15].

Therefore, the controller 130 sets priorities to the victim blocks BLOCK<1:3> corresponding to the third page group PAGE_GP[3], through the operation 1314 of the operation 1313, such that the first memory block BLOCK<1> has a highest priority, the third memory block BLOCK<3> has a lowest priority and the second memory block BLOCK<2> has a priority lower than the first memory block BLOCK<1> and higher than the third memory block BLOCK<3>.

In this way, if the first memory block BLOCK<1> is selected through the operation 1314 of the operation 1313, the controller 130 selects the total 3 valid pages [P13, P14, P15] included in the first memory block BLOCK<1>, as pages to be moved to a free block in a merge operation, through the operation 1315 of the operation 1313.

Also, if the second memory block BLOCK<2> is selected following the first memory block BLOCK<1> through the operation 1314 of the operation 1313, the controller 130 selects the total 2 valid pages [P13, P15] included in the second memory block BLOCK<2>, as pages to be moved to a free block in the merge operation, through the operation 1315 of the operation 1313.

Moreover, if the third memory block BLOCK<3> is selected following the second memory block BLOCK<2> through the operation 1314 of the operation 1313, the controller 130 selects the total one valid page [P15] included in the third memory block BLOCK<3>, as a page to be moved to a free block in the merge operation, through the operation 1315 of the operation 1313.

Summarizing these, before performing a merge operation in the second operation 1304b of the operation 1304, the controller 130 selects the first page group PAGE_GP[1] which includes most valid pages among the page groups PAGE_GP[1:3] and of which count of the valid pages included therein is equal to or greater than the threshold count, as a specific page group, through the operation 1309 and the operation 1310. Then, the controller 130 may perform the merge operation to move the total 11 valid pages [P1, P2, P3, P6] at BLOCK<1>, [P7, P10] at BLOCK<2>, [P1, P2, P3, P4, P5] at BLOCK<3> included in the first page group PAGE_GP[1], to a free block. After the merge operation is performed, through the operation 1311, the controller 130 updates the list of the victim blocks BLOCK<1:3> according to the operation 1302 based on the remaining valid pages by excluding the valid pages [P1, P2, P3, P6] at BLOCK<1>, [P7, P10] at BLOCK<2>, [P1, P2, P3, P4, P5] at BLOCK<3> included in the first page group PAGE_GP [1] among the entire valid pages [P1, P2, P3, P6, P10, P12, P13, P14, P15] at BLOCK<1>, [P7, P9, P10, P12, P13, P15] at BLOCK<2>, [P1, P2, P3, P4, P5, P6, P10, P12, P15] BLOCK<3> included in the victim blocks BLOCK<1:3>. The controller 130 updates the list of the page groups PAGE_GP[1:3] to a list of the page groups PAGE_GP[2:3] according to the operation 1303 based on the updated list of the victim blocks BLOCK<1:3>.

After the update operation is performed in this way, the controller 130 selects the second page group PAGE_GP[2], which is includes most valid pages among the page groups PAGE_GP[2:3] and of which count of the valid pages included therein is equal to or greater than the threshold count, as a specific page group through the operation 1309 and the operation 1310 again. Then, the controller 130 may perform a merge operation to move the total 7 valid pages [P10, P12] at BLOCK<1>, [P9, P12] at BLOCK<2>, [P6, P10, P12] at BLOCK<3> included in the second page group PAGE_GP[2] to a free block. After the merge operation is performed, the controller 130 updates the list of the victim blocks BLOCK<1:3> according to the operation 1302 based on the remaining valid pages by excluding the valid pages [P10, P12] at BLOCK<1>, [P9, P12] at BLOCK<2>, [P6, P10, P12] at BLOCK<3> included in the second page group PAGE_GP[2] among the entire valid pages [P10, P12, P13, P14, P15] at BLOCK<1>, [P9, P12, P13, P15] at BLOCK<2>, [P6, P10, P12, P15] at BLOCK<3> included in the victim blocks BLOCK<1:3>. The controller 130 updates the list of the page groups PAGE_GP[2:3] to a list of the page group PAGE_GP[3] according to the operation 1303 based on the updated list of the victim blocks BLOCK<1:3>.

After the merge operation is performed, while the controller 130 selects the third page group PAGE_GP[3], which includes most valid pages among page groups PAGE_GP[3], as a specific page group through the operation 1309, it is likely recognized that the count of the valid pages included in the third page group PAGE_GP[3] is less than the threshold count through the operation 1310. The controller 130 does not select the entire valid pages, included in the third page group PAGE_GP[3], as pages to be moved to a free block in a merge operation.

Instead, the controller 130 may select the valid pages [P13, P14, P15] at BLOCK<1>, [P13, P15] at BLOCK<2>, [P15] at BLOCK<3>, included in the third page group PAGE_GP[3] selected as the specific page group in the operation 1309, as pages to be moved to a free block in a merge operation. This operation 1313 in the operation 1312 may be performed by the unit of sequential block. The controller 130 may not select the valid pages [P13, P14, P15] at BLOCK<1>, [P13, P15] at BLOCK<2>, [P15] at BLOCK<3>, included in the third page group PAGE_GP[3] selected as the specific page group in the operation 1309, as pages to be moved to a free block in a merge operation.

In the case of performing the operation 1312, the controller 130 selects the valid pages [P13, P14, P15] at BLOCK<1>, [P13, P15] at BLOCK<2>, [P15] at BLOCK<3>, included in the third page group PAGE_GP[3] selected as a specific page group in the operation 1309, as pages to be moved by the unit of sequential block to a free block in a merge operation through using the method according to the operation 1313. The controller 130 moves the valid pages by the unit of block through performing a merge operation each time they are selected by the unit of block.

Figure 7:
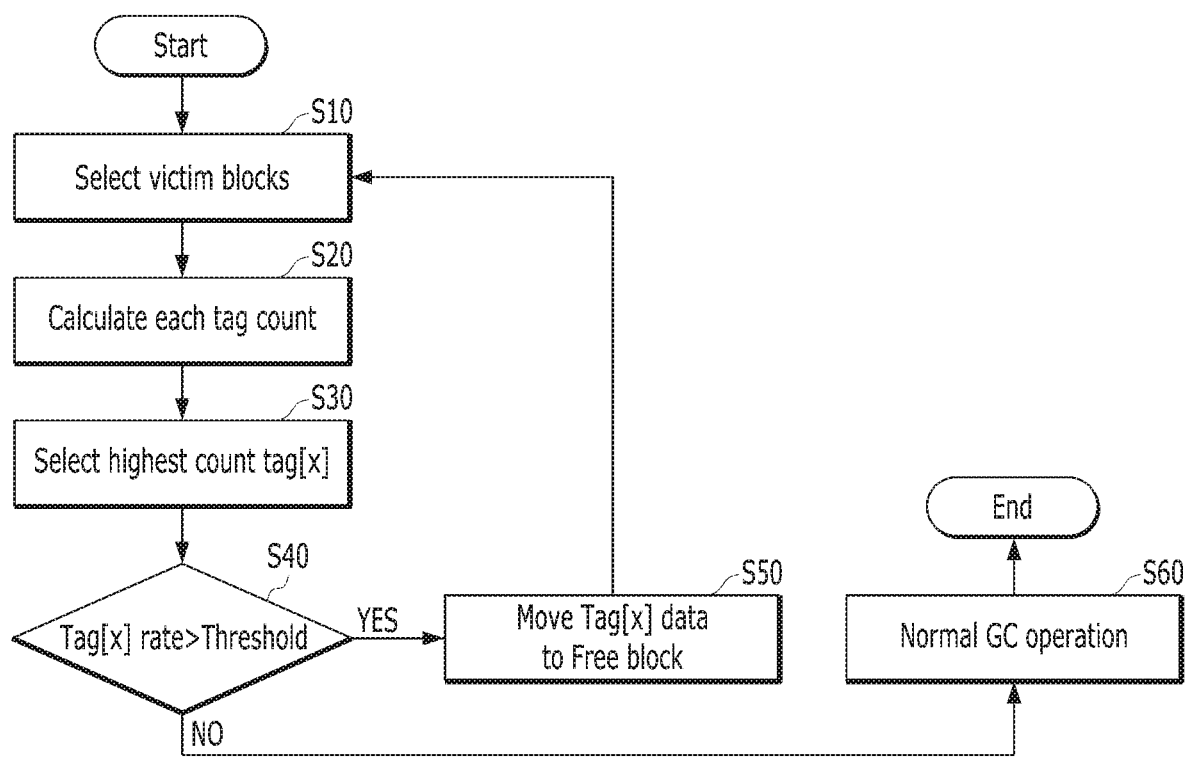
FIG. 7 is a representation of an example of a flow chart to assist in the explanation of the operation of the memory system described in FIGS. 5A to 6C.

FIG. 7 is a representation of an example of a flow chart to assist in the explanation of an example of an operation of selecting pages to be moved to a free block in a merge operation, among the entire valid pages included in victim blocks, in the operation of the memory system described above with reference to FIGS. 5A to 6C.

First, it can be seen that the flow chart shown in FIG. 7 corresponds to the second operation 1304*b* of the operation 1304 of selecting valid pages to be moved to a free block in a merge operation, among the entire valid pages included in victim blocks, depending on the count of the valid pages included in each of the N number of page groups PAGE_GP [1:N], in the operation of the memory system described above with reference to FIGS. 5A to 6C.

In detail, referring to FIG. 7, before performing a merge operation, an operation of selecting victim blocks through the operation 1302 is performed (step S10).

In step S20, classifying and managing the entire valid pages included in victim blocks, as N number of page groups PAGE_GP[1:N] may be achieved depending on the kinds of the tags TAG[1: N] included in the valid pages. Priorities are set based on the counts of the valid pages included in the N number of respective page groups PAGE_GP[1:N], through the operation 1303 and the operation 1305.

A page group having a highest priority among the N number of page groups PAGE_GP[1:N], that is, a page group including most valid pages among the N number of page groups PAGE_GP[1:N], may be selected as a specific page group through the operation 1309 (step S30).

It is checked whether the count of the valid pages included in the specific page group selected in the operation 1309 is equal to or greater than the threshold count, according to the operation 1310 (step S40).

As a result of the operation 1310, in the case where the count of the valid pages included in the specific page group selected in the operation 1309 is equal to or greater than the threshold count (YES in step S40), the valid pages included in the specific page group are moved to a free block through the operation 1311 (step S50). Then, the list of victim blocks is updated according to the operation 1302. The above-described operations are performed again from the operation S10 to update the list of the page groups PAGE_GP[1:N] according to the operation 1303.

As a result of the operation 1310, in the case where the count of the valid pages included in the specific page group selected in the operation 1309 is less than the threshold count (NO in step S40), a general merge operation may be performed (step S60). That is, the valid pages included in the victim blocks are selected in the unit of block, and the selected valid pages are moved to a free block, according to the operation 1312.

For reference, in the above-described embodiment, the 'merge operation' means a garbage collection operation. However, it is to be noted that the 'merge operation' is not limited to a garbage collection operation, and an operation of merging at least two blocks, for example, a read reclaim operation or a wear leveling operation may be included in the 'merge operation.'

FIGS. 8 to 16 are diagrams schematically illustrating application examples of the data processing system of FIG. 1.

Figure 8:
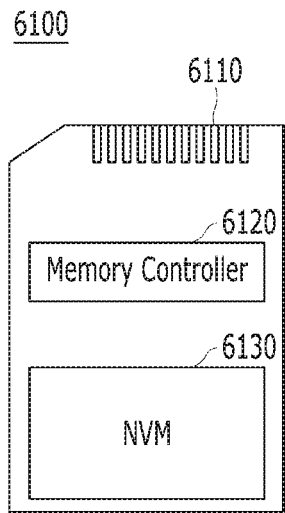
FIGS. 8 to 16 are diagrams schematically illustrating application examples of the data processing system shown in FIG. 1 in accordance with various embodiments of the present invention.

FIG. 8 is a diagram schematically illustrating another example of the data processing system including the memory system in accordance with the embodiment. FIG. 8 schematically illustrates a memory card system to which the memory system in accordance with the embodiment is applied.

Referring to FIG. 8, the memory card system 6100 may include a memory controller 6120, a memory device 6130 and a connector 6110.

The memory controller 6120 may be connected to the memory device 6130 embodied by a nonvolatile memory. The memory controller 6120 may be configured to access the memory device 6130. By the way of example but not limitation, the memory controller 6120 may be configured to control read, write, erase and background operations of the memory device 6130. The memory controller 6120 may be configured to provide an interface between the memory device 6130 and a host, and use a firmware for controlling the memory device 6130. That is, the memory controller 6120 may correspond to the controller 130 of the memory system 110 described with reference to FIGS. 1 and 5a, and the memory device 6130 may correspond to the memory device 150 of the memory system 110 described with reference to FIGS. 1 and 5a.

Thus, the memory controller 6120 may include a RAM, a processing unit, a host interface, a memory interface and an error correction unit. The memory controller 130 may further include the elements shown in FIG. 5.

The memory controller 6120 may communicate with an external device, for example, the host 102 of FIG. 1 through the connector 6110. For example, as described with reference to FIG. 1, the memory controller 6120 may be configured to communicate with an external device under one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 5.

The memory controller 6120 and the memory device 6130 may be integrated into a single semiconductor device. For example, the memory controller 6120 and the memory device 6130 may construct a solid-state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., a SM and a SMC), a memory stick, a multimedia card (e.g., a MMC, a RS-MMC, a MMCmicro and an eMMC), an SD card (e.g., a SD, a miniSD, a microSD and a SDHC) and a universal flash storage (UFS).

Figure 9:
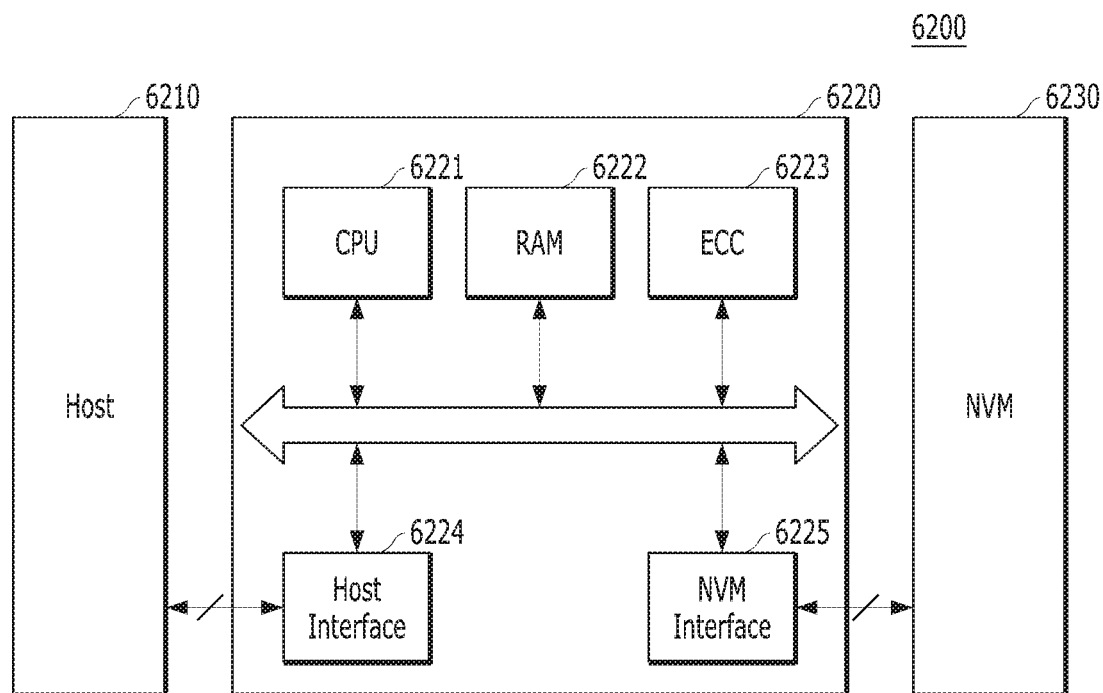

FIG. 9 is a diagram schematically illustrating another example of the data processing system including the memory system in accordance with the embodiment.

Referring to FIG. 9, the data processing system 6200 may include a memory device 6230 having one or more nonvolatile memories and a memory controller 6220 for controlling the memory device 6230. The data processing system 6200 illustrated in FIG. 9 may serve as a storage medium such as a memory card (CF, SD, micro-SD or the like) or USB device, as described with reference to FIG. 1. The memory device 6230 may correspond to the memory device 150 in the memory system 110 illustrated in FIGS. 1 and 5a. The memory controller 6220 may correspond to the controller 130 in the memory system 110 illustrated in FIGS. 1 and 5a.

The memory controller 6220 may control a read, write or erase operation on the memory device 6230 in response to a request of the host 6210. The memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221. The RAM 6222 may be used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. In this case, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224. The memory controller 6220 may transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. As the memory controller 6220 is configured to communicate with the external device through one or more of various communication protocols, the memory system and the data processing system in accordance with the present embodiment may be applied to wired/wireless electronic devices or particularly a mobile electronic device.

Figure 10:
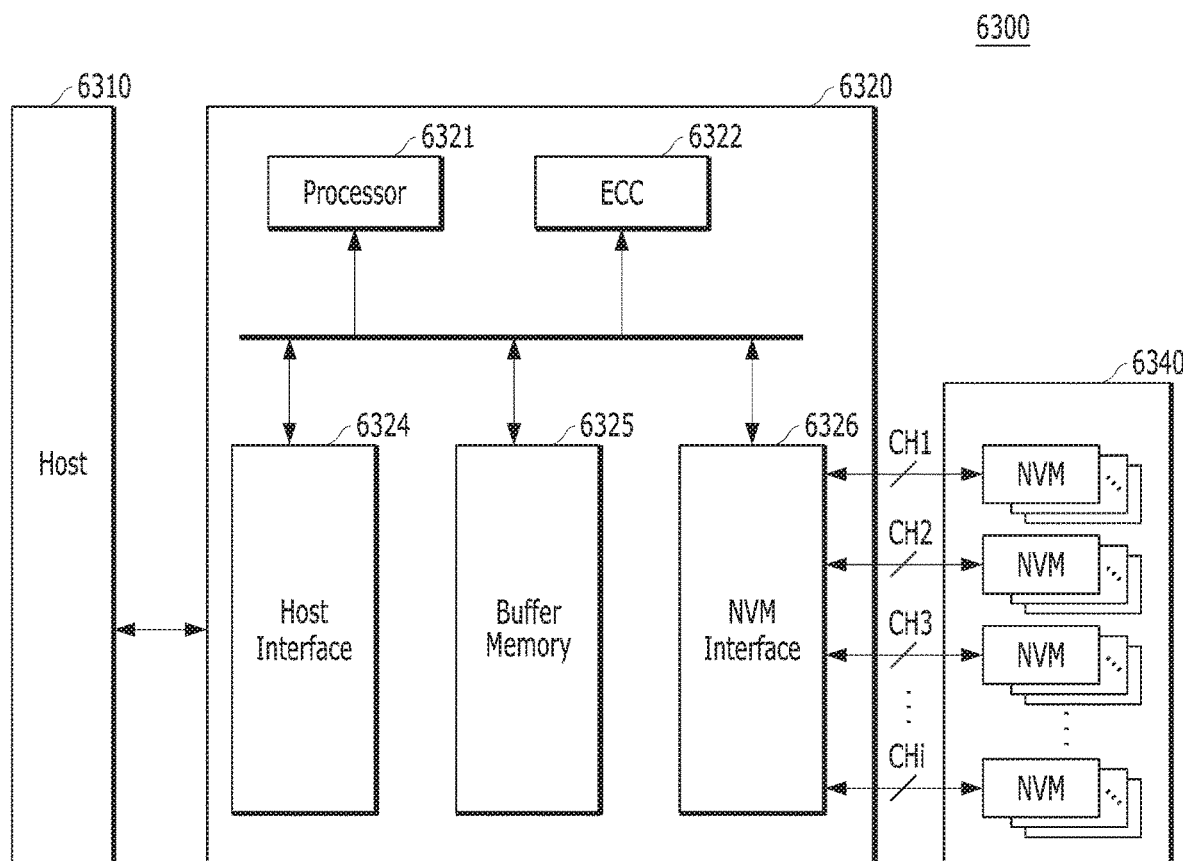

FIG. 10 is a diagram schematically illustrating another example of the data processing system including the memory system in accordance with the embodiment. FIG. 10 schematically illustrates an SSD to which the memory system in accordance with the embodiment is applied.

Referring to FIG. 10, the SSD 6300 may include a controller 6320 and a memory device 6340 including a plurality of nonvolatile memories. The controller 6320 may correspond to the controller 130 in the memory system 110 of FIGS. 1 and 5a. The memory device 6340 may correspond to the memory device 150 in the memory system of FIGS. 1 and 5a.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 9 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation. The ECC circuit 6322 may perform an error correction operation on data read from the memory device 6340 based on the ECC value during a read operation. The ECC circuit 6322 may perform an error correction operation on data recovered from the memory device 6340 during a failed data recovery operation.

The host interface 6324 may provide an interface function with an external device, for example, the host 6310. The nonvolatile memory interface 6326 may provide an interface function with the memory device 6340 connected through the plurality of channels.

Furthermore, a plurality of SSDs 6300 to which the memory system 110 of FIGS. 1 and 5a is applied may be provided to embody a data processing system, for example, RAID (Redundant Array of Independent Disks) system. In this case, the RAID system may include the plurality of SSDs 6300 and a RAID controller for controlling the plurality of SSDs 6300. When the RAID controller performs a is program operation in response to a write command provided from the host 6310, the RAID controller may select one or more memory systems or SSDs 6300 according to a plurality of RAID levels, that is, RAID level information of the write command provided from the host 6310 in the SSDs 6300. The RAID controller may output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300. The RAID controller may provide data read from the selected SSDs 6300 to the host 6310.

FIG. 11 is a diagram schematically illustrating another example of the data processing system including the memory system in accordance with the present embodiment. FIG. 11 schematically illustrates an embedded Multi-Media Card (eMMC) to which the memory system in accordance with the present embodiment is applied.

Referring to FIG. 11, the eMMC 6400 may include a controller 6430 and a memory device 6440 embodied by one or more NAND flash memories. The controller 6430 may correspond to the controller 130 in the memory system 110 of FIGS. 1 and 5a. The memory device 6440 may correspond to the memory device 150 in the memory system 110 of FIGS. 1 and 5a.

More specifically, the controller 6430 may be connected to the memory device 6440 through a plurality of channels.

The controller 6430 may include one or more cores 6432, a host interface 6431 and a memory interface, for example, a NAND interface 6433.

The core 6432 may control overall operations of the eMMC 6400. The host interface 6431 may provide an interface function between the controller 6430 and the host 6410. The NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 12 to 15 are diagrams schematically illustrating other examples of the data processing system including the memory system in accordance with the embodiment. FIGS. 12 to 15 schematically illustrate UFS (Universal Flash Storage) systems to which the memory system in accordance with the embodiment is applied.

Referring to FIGS. 12 to 15, the UFS systems 6500, 6600, 6700 and 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices or particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices or particularly mobile electronic devices through UFS protocols, and the UFS devices 6520, 6620, 6720, 6820 and the UFS cards 6530, 6630, 6730, 6830 may be embodied by the memory system 110 illustrated in FIGS. 1 and 5a. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 9 to 11, and the UFS cards 6530, 6630, 6730, 6830 may be embodied in the form of the memory card system 6100 described with reference to FIG. 8.

Furthermore, in the UFS systems 6500, 6600, 6700 and 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through various protocols other than the UFS protocol, for example, an UFDs, a MMC, a SD, a mini-SD, and a micro-SD.

Figure 12:
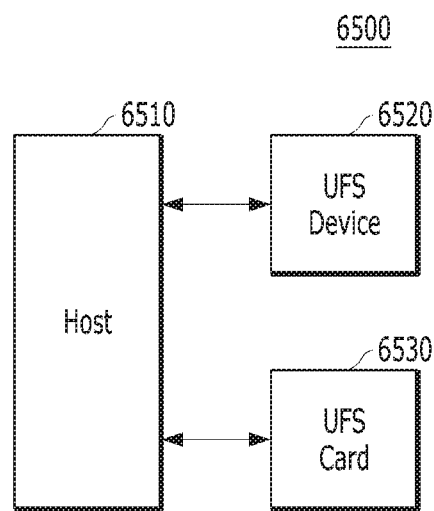

In the UFS system 6500 illustrated in FIG. 12, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. In this case, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410. The form of a star is a sort of arrangements where a single centralized component is coupled to plural devices for parallel processing. A plurality of UFS cards may be connected in parallel or in the form of a star to the UFS device 6520 or connected in series or in the form of a chain to the UFS device 6520.

Figure 13:
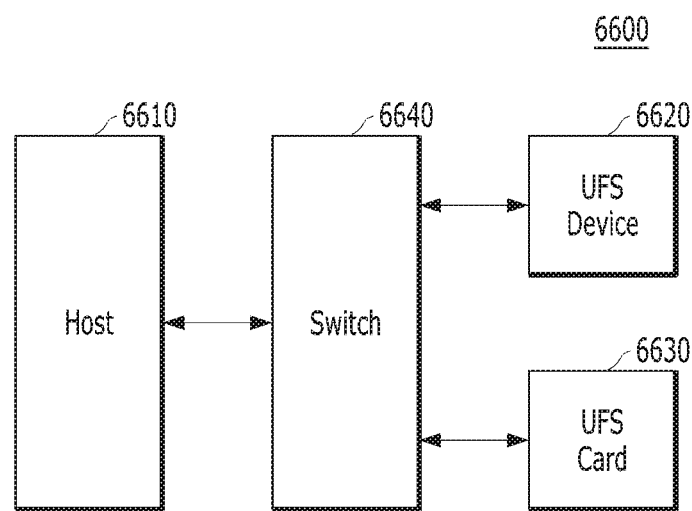

In the UFS system 6600 illustrated in FIG. 13, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 14:
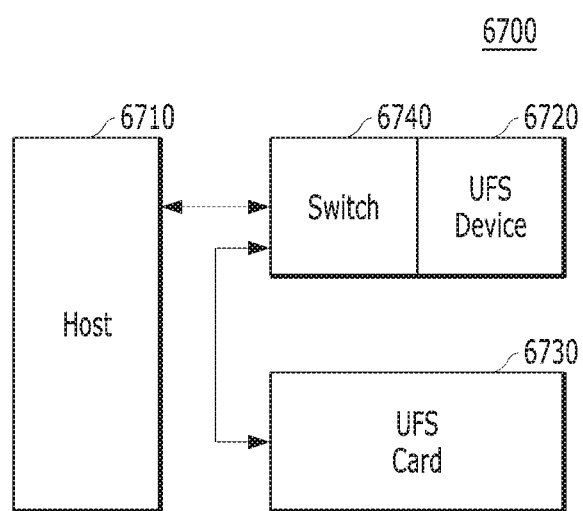

In the UFS system 6700 illustrated in FIG. 14, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. In this case, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 15:
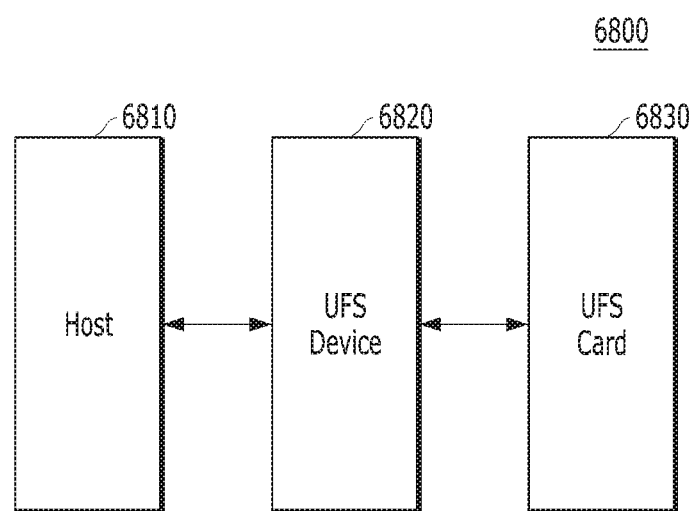

In the UFS system 6800 illustrated in FIG. 15, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. In this case, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 16:
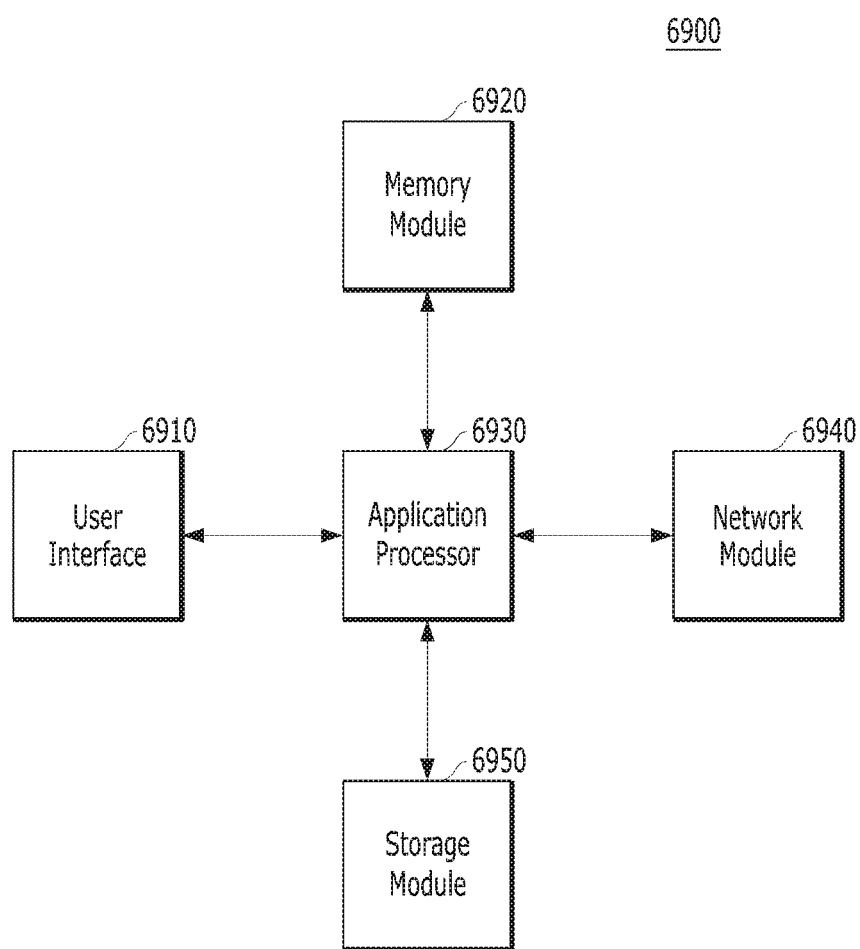

FIG. 16 is a diagram schematically illustrating another example of the data processing system including the memory system in accordance with an embodiment. FIG. 16 is a diagram schematically illustrating a user system to which the memory system in accordance with the embodiment is applied.

Referring to FIG. 16, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support is wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, a NOR flash and 3D NAND flash, and provided as a removable storage medium such as a memory card or an external drive of the user system 6900. The storage module 6950 may correspond to the memory system 110 described with reference to FIGS. 1 and 5a. Furthermore, the storage module 6950 may be embodied as an SSD, an eMMC and an UFS as described above with reference to FIGS. 10 to 15.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 and 5*a* is applied to a mobile electronic device of the user system 6900, the application processor 6930 may control overall operations of the mobile electronic device. The network module 6940 may serve as a communication module for controlling wired/wireless communication with an external device. The user interface 6910 may display data processed by the processor 6930 on a display/touch module of the mobile electronic device, or support a function of receiving data from the touch panel.

In the present technology, when storing, in a memory device, the data applied from a host, tags corresponding to the usage patterns of the respective data are stored together, and, when searching valid pages for a merge operation, whether to select valid pages as victim pages is determined depending on the tags stored in the respective valid pages.

Through this, it is possible to efficiently select victim pages in the merge operation.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
a nonvolatile memory device including a plurality of memory blocks each including a plurality of pages; and
a controller suitable for, when writing a plurality of data in the pages according to a write request from a host, writing the plurality of data with tags, classified into N number of kinds depending on a usage pattern of each data, together in the pages,
wherein the controller manages a list of victim blocks as a target of a merge operation, based on counts of valid pages included in the respective memory blocks,
wherein the controller manages entire valid pages included in the victim blocks, by classifying them into N number of page groups depending on a kind of each of the entire valid pages, and
wherein the controller selects valid pages to be moved to a free block in the merge operation, among the entire valid pages, depending on a count of valid pages included in each of the N number of page groups, and N is a natural number of 2 or greater,
wherein the controller sets a high priority when a count of valid pages included in each of the N number of page groups is large, and sets a low priority when a count of valid pages included in each of the N number of page groups is small.

2. The memory system according to claim 1, wherein the controller sequentially selects M number of page groups in each of which a count of valid pages is equal to greater than a threshold count, among the N number of page groups, depending on a priority, moves valid pages of a selected page group to a free block in the merge operation, and M is equal to or less than N.

3. The memory system according to claim 2, wherein, in the case where M is less than N, before performing the merge operation, the controller sets priorities of the respective victim blocks corresponding to N-M number of page groups, based on counts of valid pages included in the respective victim blocks, sequentially selects the respective victim blocks corresponding to the N-M number of page groups according to the set priorities, moves valid pages of a selected page group in the merge operation, to a free block, and then moves valid pages of a selected block, to a free block.

4. The memory system according to claim 1, wherein, in the case where a count of valid pages included in a specific page group having a highest priority among the N number of page groups is equal to or greater than the threshold count, the controller moves the valid pages included in the specific page group, to a free block in the merge operation, updates the list of the victim blocks, updates the N number of page groups based on an updated list of victim blocks, and selects again valid pages to be moved to a free block in a following merge operation.

5. The memory system according to claim 4, wherein, in the case where the count of the valid pages included in the specific page group is less than the threshold count, the controller sets priorities of the respective victim blocks based on counts of valid pages included in the victim blocks, sequentially selects the respective victim blocks according to the set priorities, and moves valid pages of a selected block, to a free block in the merge operation.

6. The memory system according to claim 1, wherein the controller generates N kinds of tags corresponding to the respective data according to a result of analyzing usage patterns of the data applied from the host, and stores the data and the N kinds of tags corresponding to the respective data together in the pages.

7. The memory system according to claim 1, wherein the controller receives the data and N kinds of tags corresponding to the respective data from the host, and stores them together in the pages.

8. The memory system according to claim 1, wherein the data are classified into hot data, warm data and cold data depending on a usage pattern.

9. The memory system according to claim 1, wherein the data are classified into L number of kinds in correspondence to K number of workloads performed in the host, K is a natural number and L is a natural number equal to or greater than K.

10. A method for operating a memory system including a nonvolatile memory device including a plurality of memory blocks each including a plurality of pages, the method comprising:
writing, when writing a plurality of data in the pages according to a write request from a host, the plurality of data with tags classified into N number of kinds depending on a usage pattern of each data, together in the pages;
a first managing act of managing a list of victim blocks as a target of a merge operation, based on counts of valid pages included in the respective memory blocks;
a second managing act of managing entire valid pages included in the victim blocks, by classifying them into N number of page groups depending on a kind of each of the entire valid pages;
a selecting act of selecting valid pages to be moved to a free block in the merge operation, among the entire valid pages, depending on a count of valid pages included in each of the N number of page groups;
a merging act of moving the valid pages selected in the selecting act, to a free block in the merge operation; and
a first setting act of setting a high priority when a count of valid pages included in each of the N number of page groups managed in the second managing act is large, and setting a low priority when a count of valid pages included in each of the N number of page groups managed in the second managing act is small wherein N is a natural number of 2 or greater.

11. The method according to claim 10, wherein the selecting act comprises:

a first selecting act of sequentially selecting M number of page groups in each of which a count of valid pages is equal to greater than a threshold count, among the N number of page groups, depending on a priority set through the first setting act, and selecting valid pages of a selected page group as pages to be moved to a free block in the merge operation, and wherein the merging act moves valid pages selected by the unit of page group through the first selecting act, to a free block, and M is a natural number equal to or less than N.

12. The method according to claim 11, wherein, in the case where M is less than N, the selecting act further comprises:

a second setting act of, before performing the merge operation after the first selecting act, setting priorities of the respective victim blocks corresponding to N-M number of page groups, based on counts of valid pages included in the respective victim blocks; and a second selecting act of sequentially selecting the victim blocks corresponding to the N-M number of page groups according to the priorities set in the second setting act, and selecting valid pages of a selected block, as pages to be moved to a free block in the merge operation, and wherein the merging act moves valid pages selected by the unit of page group through the first selecting act, to a free block in the merge operation, and then, moves valid pages selected by the unit of block through the second selecting act, to a free block in the merge operation.

13. The method according to claim 10, wherein the selecting act further comprises:

a third selecting act of selecting, among the N number of page groups, a specific page group having a highest priority depending on a priority set through the first setting act, and selecting, in the case where a count of valid pages included in the specific page group is equal to or greater than the threshold count, the valid pages of the specific page group, as pages to be moved to a free block in the merge operation, and wherein, after moving, through the merging act, all valid pages selected in the third selecting act, the list of the victim blocks managed in the first managing act is updated, the N number of page groups managed in the second managing act is updated based on an updated list of victim blocks, and then the third selecting act is performed again.

14. The method according to claim 13, wherein the selecting act further comprises:

a third setting act of setting, in the case where the count of the valid pages included in the specific page group is less than the threshold count, priorities of the respective victim blocks based on counts of valid pages included in the victim blocks; and a fourth selecting act of sequentially selecting the victim blocks according to the priorities set in the third setting act, and selecting valid pages of a selected block, as pages to be moved to a free block in the merge operation.

15. The method according to claim 10, wherein the writing comprises:

generating N kinds of tags corresponding to the respective data according to a result of analyzing usage patterns of the data applied from the host; and storing the data and the N kinds of tags corresponding to the respective data together in the pages.

16. The method according to claim 10, wherein the writing comprises:

receiving the data and N kinds of tags corresponding to the respective data from the host; and storing the data and the N kinds of tags corresponding to the respective data together in the pages.

17. The method according to claim 10, wherein the data are classified into hot data, warm data and cold data depending on a usage pattern.

18. The method according to claim 10, wherein the data are classified into L number of kinds in correspondence to K number of workloads performed in the host, K is a natural number and L is a natural number equal to or greater than K.

* * * * *